Feb. 22, 1966 J. A. RABO ET AL 3,236,761
HYDROCARBON CONVERSION PROCESS AND CATALYST
Filed Feb. 7, 1962 8 Sheets-Sheet 1

INVENTORS
JULE A. RABO
JAMES E. BOYLE
PAUL E. PICKERT

BY William F. Masinger
ATTORNEY

INVENTORS
JULE A. RABO
JAMES E. BOYLE
PAUL E. PICKERT

INVENTORS
JULE A. RABO
JAMES E. BOYLE
PAUL E. PICKERT

BY William F. Mesinge
ATTORNEY

INVENTORS
JULE A. RABO
JAMES E. BOYLE
PAUL E. PICKERT

BY William F. Mesinger
ATTORNEY

Feb. 22, 1966    J. A. RABO ETAL    3,236,761
HYDROCARBON CONVERSION PROCESS AND CATALYST
Filed Feb. 7, 1962

INVENTORS
JULE A. RABO
JAMES E. BOYLE
PAUL E. PICKERT

BY William F. Mesinger
ATTORNEY

Feb. 22, 1966 J. A. RABO ET AL 3,236,761
HYDROCARBON CONVERSION PROCESS AND CATALYST
Filed Feb. 7, 1962 8 Sheets-Sheet 8

INVENTORS
JULE A. RABO
JAMES E. BOYLE
PAUL E. PICKERT

BY William F. Mesinger
ATTORNEY

United States Patent Office 3,236,761
Patented Feb. 22, 1966

3,236,761
HYDROCARBON CONVERSION PROCESS
AND CATALYST
Jule A. Rabo, White Plains, Paul E. Pickert, North
Tonawanda, and James E. Boyle, Williamsville, N.Y.,
assignors to Union Carbide Corporation, a corporation
of New York
Filed Feb. 7, 1962, Ser. No. 172,070
35 Claims. (Cl. 208—111)

This is a continuation-in-part of copending application Serial Nos. 862,764 and 862,989 both filed December 30, 1959 in the names of Jule A. Rabo et al. Serial No. 862,989 has been abandoned and Serial No. 862,764 issued April 21, 1964 as U.S. Patent No. 3,130,006.

This invention relates to a hydrocarbon conversion process and to a catalyst therefor. More particularly, this invention relates to a process for cracking, hydrocracking, polymerization, alkylation, dealkylation, reforming and isometrization of hydrocarbons using a zeolitic molecular sieve catalyst.

Hydrocarbon conversion and the isomerization of hydrocarbons in particular is of special importance to the petroleum industry. In recent years, with the advent of high horsepower gasoline-driven internal combustion motors, a need has arisen for higher octane number gasolines. Natural straight-run gasolines, i.e., naphthas, contain chiefly, normal paraffins, such as normal pentane and normal hexane, which have relatively low octane numbers, i.e., too low for modern high power requirements. It has become essential, therefore, to convert these low octane components to their higher octane counterparts. The isomerization of these hydrocarbon components accomplish this conversion, i.e., the isomers resulting have a much higher octane rating. Hence, the facility with which this isomerization is accomplished has become of prime importance.

Formerly, straight-run naphtha of low octane quality was used directly as motor gasoline. However, with the above-described need for higher-octane gasoline arising, attempts were made at thermally rearranging or reforming the naphtha molecules for octane number improvement. "Reforming" is the term employed by the petroleum industry to refer to the treatment of gasoline fractions having a boiling range above about 90° C. to obtain higher octane ratings and improved "anti-knock" characteristics through the formation of aromatic as well as branched chain hydrocarbons. The thermal reforming of gasoline proved to be inadequate and catalytic reforming in a hydrogen-rich atmosphere, in large part, was substituted therefor by the gasoline industry.

In this regard, also, to permit full use to be made of tetraethyl lead (which is less effective with aromatics than with paraffins), high octane paraffins must be incorporated in gasoline blends. Such high octane paraffins can only be obtained from alkylation (which may require butane isomerization) or from the isomerization of pentanes, hexanes, or other light straight-chain hydrocarbons.

Among the isomerization processes known in the art, the most recent have dealt with converting normal paraffins, such as pentane and hexane, to their branch-chain counterparts by contacting, in the presence of hydrogen, the straight-chain hydrocarbons at an elevated temperature and pressure with a reforming type solid catalyst. U.S. Patent 2,831,908 and British Patent 788,588 relate to such processes. In each of the processes disclosed in these patents, however, a corrosive activator, such as a halide, is employed in the catalyst. Moreover, neither of these processes can be used for isomerizing a mixture of n-pentane and n-hexane with a high degree of efficiency.

The catalysts employed for the reforming of gasoline fractions boiling above 90° C., to higher octane products also employ acidic halide activators of objectionably corrosive nature.

It is known in the art to improve the equality of hydrocarbons, particularly petroleum hydrocarbons, by contacting them at various operating conditions with catalysts to effect the above-mentioned hydrocarbon conversions. The conventional catalytic cracking process is carried out at almost atmospheric pressure (8–20 p.s.i.g.) at 470–510° C. on fluid or moving catalyst beds. In catalytic cracking, about 6% of the feed is converted to coke and will be deposited on the catalyst. Therefore, to enable continuous processing, the catalyst must be operated for about 10 minutes in cracking and subsequently for 20 minutes in regeneration by burn-off. The catalyst used today is a $SiO_2$-$Al_2O_3$ composite with from 12 to 25% $Al_2O_3$ content. About 80% of the commercial cracking catalyst is synthetic $SiO_2$-$Al_2O_3$ gel and 20% is properly processed montmorillonite clay. The only component of the final catalyst is $SiO_2$-$Al_2O_3$.

Heretofore, only strong mineral and Lewis-type acids have been found to be effective as catalysts for alkylation activity. Many difficulties have been encountered because of the corrosive nature of these strong acid catalysts thereby limiting the operating conditions of the conversion process.

An object of the present invention is to provide an improved process and catalyst for hydrocarbon conversion.

Another object of the present invention is to provide improved process and catalyst for isomerization, reforming, cracking, polymerization, alkylation, dealkylation, hydrogenation, dehydrogenation and hydrocracking of hydrocarbons.

Other objects and advantages of the present invention will be apparent from the ensuing description and appended claims.

By "hydrocarbon conversion process" is meant, in general, those processes for improving the octane number of gasoline or converting heavy hydrocarbons to light, low boiling hydrocarbons or converting hydrocarbons by hydrogenation or dehydrogenation to, for example, aromatics. Hence, among those processes included in the term "hydrocarbon conversion" are isomerization, reforming, cracking, polymerization, alkylation, dealkylation, hydrogenation, dehydrogenation and hydrocracking.

According to the present invention, a novel catalyst for the conversion of hydrocarbon comprises a "decationized" crystalline zeolitic molecular sieve having a $SiO_2/Al_2O_3$ molar ratio greater than 3, preferably greater than 3.3 with best results between 3.5–6.0. It has been discovered that such a catalyst is effective for converting hydrocarbons in a process in which the mechanism of reaction of the hydrocarbons is postulated to pass through an ionic-type reaction, i.e., through the formation of carbonium ions. It has also been discovered that such a catalyst, when loaded with a catalytically active metal, especially metals of Group VIII of the Periodic Table, in an amount of at least about 0.05 weight percent, is also effective for converting hydrocarbons in a process in which the mechanism of reaction of the hydrocarbons is postulated to pass through an ionic-type reaction.

The term "zeolite," in general, refers to a group of naturally occurring hydrated metal aluminosilicates, many of which are crystalline in structure. However, a number of synthetic crystalline zeolites have been prepared. They are distinguishable from each other and from the naturally occurring material, on the basis of their composition, their crystal structure and their adsorption properties. A suitable method for describing the crystal structure, for example, is by their X-ray powder diffraction patterns.

Crystalline zeolites structurally consist basically of an open 3-dimensioned framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalvence of tetrahedra containing aluminum is balanced by the inclusion within the crystal, of cations, e.g., alkali metal or alkaline earth metal cations. This balance may be expressed by the formula $$2Al/(2Na, 2K, 2Li, Ca, Ba, Sr, etc.) = 1 \pm 0.15$$

Moreover, it has been found that one cation may be replaced by another by suitable exchange techniques. Consequently, crystalline zeolites are often employed as ion-exchange agents. The cations are located in the vicinity of the $AlO_4$ tetrahedra, but their exact location depends on the valency and the size of the cations. The replacement of the cations with other electro-positive cations does not induce appreciable changes in the anionic framework. Therefore, any particular zeolitic molecular sieve can be identified independent of the type of cation it contains by the X-ray diffraction pattern and its other chemical components.

It is also known that the crystal structures of many zeolites exhibit interstices of molecular dimensions. The interstitial spaces are generally occupied by water of hydration. Under proper conditions, viz., after at least partial dehydration, these zeolites may be utilized as efficient absorbents whereby adsorbate molecules are retained within the interstitial spaces. Access to these channels is had by way of orifices in the crystal lattice. These openings limit the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves." As stated heretofore, the novel hydrocarbon conversion processes with which this invention is concerned, has, as one of its essential features, the utilization therein of a novel zeolitic catalyst having the general structure also set forth above.

As previously indicated, a zeolitic molecular sieve is utilized as the novel catalyst for the improved hydrocarbon conversion process. It has been discovered that the catalytic activity of the zeolite employed is strongly dependent on (1) the pore size, (2) crystallinity, (3) the silica-to-alumina molar ratio and (4) and the amount of decationization in the structure.

The pore size is important to the catalytic activity in that it must be larger than the molecules of the feed and the product. The molecules should be admitted and desorbed freely from the structure. Therefore, in hydrocarbon conversion processes only large pore size molecular sieves able to internally adsorb benzene are practical. The pore size can also be defined as one large enough to admit a substantial amount of branched-chain $C_4$ to $C_{10}$ hydrocarbons and to release their structurally rearranged counterparts or isomers.

For the purposes of this invention, the term "decationized" relates to that unique condition whereby a substantial amount, i.e., at least 10 percent of the aluminum atoms of the aluminosilicate structure are not associated with any cations. Another way of expressing "decationization" is that condition whereby less than 90 percent of the aluminum atoms of the aluminosilicate structure are associated with cations. The decationization of the novel catalysts of this invention may be accomplished by ion-exchanging the alkali metal cations of the zeolite with ammonium ions or other easily decomposable cations such as methyl or other substituted quaternary ammonium ions, and then heating the ammonium exchanged zeolite to temperatures of between about 350° C. and about 600° C. While the exact mechanism of the decationization process is not fully understood, the following equation showing the decationization of an ammonium cation exchanged zeolitic molecular sieve can be taken as illustrative:

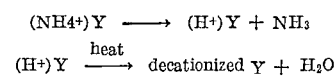

$$(NH_4^+)Y \longrightarrow (H^+)Y + NH_3$$
$$(H^+)Y \xrightarrow{heat} \text{decationized } Y + H_2O$$

It is noted that water is evolved in the second equation of the decationization process. This water is believed to be constituted of hydrogen from the cation sites and an equivalent amount of oxygen released from the aluminosilicate framework. That the crystal structure does not collapse when this oxygen is removed is surprising. It is belived that this stability is attributable to the silica to alumina ratio of greater than 3. The process for producing this decationized zeolitic molecular sieve is more fully described in our U.S. patent application Serial No. 862,764 filed December 30, 1959 and issued April 21, 1964 as U.S. Patent No. 3,130,006.

For best catalytic results, the degree of decationization should be at least 40 percent and preferably above about 65 percent. It is to be observed that at the preferred degrees of decationization of our catalyst the low silica-to-alumina ratio molecular sieves, such as zeolite X which is described in U.S. Patent No. 2,882,244, lose their crystallinity and the uniformity of their pore openings whereas molecular sieves having silica to alumina ratios above 3, such as zeolite Y, retain their crystallinity even when fully, i.e., 100 percent, decationized.

The crystallinity of the zeolite strongly influences catalyiic activity. Zeolite catalysts having crystalline structures are more active than the non-crystalline zeolites with the same chemical composition. The catalytic hydrocarbon reaction occurs at high temperatures. Hence, the crystal structure of the catalyst should be heat stable at the reaction temperature. In this regard, silica-alumina ratios greater than 3 have been found to improve heat stability.

It has been discovered that when a catalytically active metal, especially metals of Group VIII such as platinum or palladium, is provided in finely-dispersed catalytic amounts, that is, 0.05 to 2.0 weight percent, and contained by a zeolitic molecular sieve having less than 90 percent of the aluminum atoms of the aluminosilicate structure associated with cations and having a silicon dioxide to aluminum trioxide molar ratio greater than 3, a novel catalyst results which, when coupled with the other essential reaction conditions of the present process, will provide a hydrocarbon conversion catalyst. It should be noted, however, that the presence of the metal in amounts higher than 2.0 percent will also catalyze the conversion of hydrocarbons. However, it has been found that the use of more than 2.0 percent of the metals such as the noble metals does not substantially enhance catalytic activity and hence is superfluous as well as exorbitantly expensive. The catalytically active metals may be dispersed upon the molecular sieve in their elemental state or as oxides or compounds having catalytic properties. Among the metals and their oxides which have hydrocarbon conversion activity are copper, silver, gold, zinc, cadmium, titanium, tin, lead, vanadium, antimony, bismuth, chromium, molybdenum, tungsten, manganese, rhenium, iron, cobalt, nickel and the noble metals of the palladium and platinum groups.

It has been discovered that, although the decationized metal containing and non-metal containing zeolite catalysts exhibit catalytic activity for all hydrocarbon conversion processes, the decationized metal containing zeolite catalysts of the present invention show improved results in certain specific conversion processes. Included in such processes are: isomerization, reforming, hydrocracking alkylation and dealkylation. The preferred metals are palladium and platinum.

The catalytically active metals may be introduced to the crystalline aluminosilicate by any method which will result in the attainment of a highly dispersed catalytically active metal. Among the methods which have been successfully employed are (1) impregnation using an aqueous solution of a suitable metal compound followed by drying and thermal or chemical decomposition of the metal compound; (2) adsorption of a fluid decomposable compound of the metal followed by thermal or chemical decomposition of the metal compound; (3) cation exchange using an aqueous solution of a suitable metal salt followed by chemical reduction of the cations; (4) cation exchange using an aqueous solution of a suitable metal compound in which the metal is in the cationic state with coordination complexing agents followed by thermal or chemical decomposition of the cationic complex. Methods (1), (2) and (3) are conveniently employed to introduce metals such as copper, silver, gold, cadmium, iron, cobalt and nickel while methods (1), (2) and (4) are suitable for introducing the platinum and palladium group metals. Method (2) is suitable for introducing metals such as titanium, chromium, molybdenum, tungsten, rhenium, manganese, zinc and vanadium. The metal loading techniques of methods (2), (3) and (4) are preferred as the resulting products exhibit higher catalytic activity than those produced by method (1). The ion exchange techniques of methods (3) and (4) are particularly advantageous since their products have exhibited the highest catalytic activities. Methods (2), (3) and (4) are preferred because of the deposition of the active metal throughout the inner adsorption area of the molecular sieve, the most active dispersion being achieved by methods (3) and (4).

The impregnation method (1) may be practiced in any way that will not destroy the essential structure of the crystalline zeolitic aluminosilicate. Impregnation differs from the other loading methods of this invention in that the metal is commonly in the anionic part of a water soluble compound and thus is only deposited on the external surfaces of the zeolite. In preparing the catalyst, a water soluble compound of the metal, such as a Group VIII metal, in an amount sufficient to contain the quantity of metal desired in the finally prepared catalyst product is dissolved in water and mixed with the crystalline zeolite. The zeolite is then dried and heated to a temperature sufficient to thoroughly remove the water leaving the metal of the compound in a uniform deposit. Further heating may in some instances be required to convert the metal to its active state, such as heating in hydrogen or other reducing atmospheres.

Method (2) provides a means for depositing the active metals in the inner adsorption region of the molecular sieves. The zeolite is first activated to remove any adsorbed water and then contacted with a fluid decomposable compound of the metal thereby adsorbing the compound into the sieve. Typical of such compounds are the metal carbonyls, metal alkyls, volatile metal halides and the like. The internally adsorbed compound is then reduced thermally or chemically to its elemental metal thus leaving an active metal uniformly dispersed throughout the internal adsorption region of the molecular sieve.

It is preferred that the zeolitic crystalline aluminosilicate be ammonium ion-exchanged to the desired degree prior to the impregnation step or adsorption step, depending on the method in use, for the reason that some removal of the already deposited metal compound would result if the ammonium ion-exchange was accomplished after these steps. In order to effect the best distribution of the metal compound on the catalyst, the aqueous solution of the metal compound in the impregnation method should be as concentrated as practical. To this end the best results are obtained if at least some of the water contained in the inner pores of the ammonium ion-exchanged zeolite has been removed prior to mixing with the impregnation solution. Such removal is effected by heating to about 125° C. Temperatures up to 200° C. may be employed for this drying and will effect a more complete removal of the water.

As stated above the solution should be as concentrated as practical commensurate with achieving a uniform distribution of the metal compound on the zeolite. Practical quantities of water are in the range by weight of the zeolite from about 30 percent to 100 percent. Less than 30 percent will not wet zeolite thoroughly enough to distribute uniformly and over 100 percent will allow some solution to run-off with resultant loss of metal compound. About 60 weight percent has been found to produce good results. The thus impregnated zeolite may then be dried by heating to about 125° C. to evaporate enough of the water so that a powder product is obtained which may easily be pelletized in a conventional pellet press. The product may be then stored and the activation process requiring high temperature, and sometimes hydrogen treatment, may be effected when the pellets have been installed in the reaction chamber for use. The activation method is discussed hereinafter.

The ion-exchange methods (3) and (4) differ since (3) relates to the use of metal salts such as the chlorides and nitrates of the iron group metals, wherein the metal itself is that cation, whereas (4) relates to the use of compounds of metals, such as the platinum and palladium group metals, in which the metal is contained in the cationic portion of the compound in coordination complex form.

The ion-exchange may be practiced in standard fashion, i.e., the metal compound is dissolved in an excess of water in an amount calculated to obtain the desired amount of metal in the catalyst product. This solution is preferably then added to the previously ammonium exchanged zeolite with stirring and after a sufficient time has elapsed to allow the ion-exchange to take place the exchanged zeolite is separated by filtration. The ion-exchange of the active metal containing cations into the zeolite is substantially quantitative and the completeness of the exchange process can be detected by chemical tests for the metal in a sample of liquid from the exchanging solution. The filtered zeolite may then be washed to the extent necessary to remove any residual occluded salts followed by drying to produce a pelletizable powder. Decomposition of the active metal containing cation is effected by heating to above 300° C. and preferably above 400° C. When the metal employed is of the iron-group, it is preferred to conduct this operation in a reducing atmosphere such as provided by hydrogen, methane or carbon monoxide while in the case of the noble metals air may be employed. This is preferably done after the powder has been pelletized, since if it is done beforehand it becomes necessary to perform the pelletizing operation in a dry atmosphere to avoid rehydration beyond the extent that is preferred as discussed hereinafter.

The better catalytic activity shown by the metals introduced in the crystalline zeolite by ion-exchange rather than impregnation is believed due to the greater dispersion of the metal within the inner adsorption region of the crystalline zeolite achievable with ion-exchange techniques. It is believed that the metal introduced by ion-exchange techniques is dispersed throughout the crystalline zeolite in essentially atomic dispersion. To more clearly show the improved activity of the metal loaded by ion-exchange techniques, two catalysts were prepared from the same zeolite and tested for isomerization activity. The two catalysts were prepared from decationized zeolite Y by (1) ion-exchange with the $Pd(NH_3)_4^{+2}$ cation, and (2) impregnation with the $Pd\ Cl_4^{-2}$ anion. Both catalysts were prepared from the same decationized zeolite Y preparation and were activated in the same manner, i.e., heated in air to 500–520° C. prior to reduction in $H_2$ at 500° C. The catalytic activity of these catalysts is set forth in the following table:

oughly dried before use. This feature is completely avoided by the process of the present invention. It should be emphasized, however, that under certain conditions activators may be employed in the process of this invention. However, even without the use of activators the equilibrium in the isomerization of the hexane and pentane fractions can be approached with facility.

Since the present catalyst containing active metal usually has a relatively high water content after introduction of the metal the present invention includes that it be activated before use since the catalyst is sensitive to the rate at which the water is desorbed. The activation procedure recommended for this catalyst involves the following steps:

(1) The catalyst should be heated slowly in air at 300° C. to 600° C. and preferably at 500° C.

(2) The catalyst should then be heated slowly from room temperature to about 500° C. in a stream of hydrogen gas at atmospheric pressure.

The temperature may be held at about 500° C. for several hours for maximum benefit; the temperature

| Catalyst | Decationized zeolite Y with 0.5 wt. percent Pd by ion-exchange | | | | Decationized zeolite Y impregnated with 0.5 wt. percent Pd | | |
|---|---|---|---|---|---|---|---|
| Constant process conditions: | | | | | | | |
| Pressure, p.s.i.g | 450 | 450 | 450 | 450 | 450 | 450 | 450 |
| $H_2$: H.C., molar | 3.5 | 3.5 | 3.5 | 3.5 | 3.5 | 3.5 | 3.5 |
| W.H.S.V.,ª g./g./hr | 2.0 | 2.0 | 2.0 | 2.0 | 2.0 | 2.0 | 2.0 |
| Feed stock | (ᵇ) | (ᵇ) | (ᵇ) | (ᵇ) | (ᵇ) | (ᵇ) | (ᵇ) |
| Temperature, ° C. inlet | 320–335 | 320–335 | 320–335 | 320–335 | 320–335 | 320–335 | 320–335 |
| Hours on stream, cumulative | 1 | 31 | 52 | 76 | 2 | 24 | 31 |
| Product analysis, Mol percent: | | | | | | | |
| Total hexanes | 95.1 | 94.6 | 94.7 | 95.4 | 94.8 | 95.2 | 95.3 |
| Total isohexanes | 72.1 | 70.4 | 69.7 | 69.6 | 72.2 | 67.5 | 66.8 |
| n-hexane | 23.0 | 24.2 | 25.0 | 25.8 | 22.6 | 27.7 | 28.5 |
| 2,2-dimethylbutane | 13.7 | 11.8 | 10.1 | 9.3 | 13.8 | 8.4 | 6.9 |

ª Weight-hr. space velocity. ᵇ n-Hexane (98 mol percent)+10 p.p.m. as butylmercaptan.

The data shows that at the same initial temperature the catalyst loaded by the impregnation method had the same initial activity as the catalyst loaded by ion-exchange. However, it is more significant to note, that although the catalyst loaded by impregnation had a respectable activity, initially, the activity declined rapidly. The ion-exchange loaded catalyst, on the other hand, retained most of its activity for 76 hours.

As aforementioned, an ion-exchange of from 40 to 100 percent of the sodium or alkali-metal ions by ammonium ions and the subsequent thermal decationization thereof is preferred. The results obtained thereby are extremely significant when compared with lesser decationization. In other words, the decationized catalytic form is more effective when at least 40 percent of the aluminum atoms are not associated with cations and most effective above 65 percent.

Moreover, while good results are obtained with catalysts containing the catalytically active metal, especially the metals of Group VIII, dispersed therein in amounts of from 0.05 to 2.0 weight percent, best results are obtained when employing an amount of the metals and in particular, noble metals such as platinum and palladium in a range of 0.2–0.6 weight percent.

It should be emphasized that the present catalyst, unlike those of prior art, does not employ the usual corrosive halide activators, i.e., such as chorine, fluorine, etc. to enhance its activity. Moreover, the present catalyst is water-resistant under the reaction conditions set forth above. This feature is a direct result of the avoidance of halide activators. If halide activators were present in the catalyst, by adding water, corrosive hydrogen chloride or hydrogen fluoride would be formed and would leave the catalyst. Water amounts up to 1000 parts per million in the hydrocarbon feed, however, are tolerable for short periods of time to the catalyst of the present invention. In the prior art, on the other hand, the water in the feed had to be below 20 parts per million. Hence, the fed in the prior art had to be thorshould then be reduced to the hydrocarbon process temperature, adjusting the pressure in the reactor to establish the conditions recommended for conversion. Hydrogen flow-rate during activation should be about 2 liters of gas at N.T.P., per cubic centimeters of catalyst per hour. A typical temperature program for activation is shown below in Table I.

TABLE I

| Temperature, ° C.: | Time (hours) |
|---|---|
| Room temp. to 80 | 1 |
| 80 to 120 | 2 |
| 120 to 150 | 1 |
| 150 to 200 | 1 |
| 200 to 250 | 1 |
| 250 to 300 | 1 |
| 300 to 350 | 2 |
| 350 to 500 | 1 |
| 500 | 16 |
| Total | 26 |

For example, the pretreatment of an 0.5 precent platium loaded decationized zeolite Y molecular sieve isomerization catalyst has been found to be particularly critical. For the complete activation of this catalyst prior to its use for isomerization, the following steps were employed: The catalyst was prepared from a sodium Y zeolite in which approximately 80 percent of the sodium cations were exchanged to ammonium cations prior to metal cation exchange. The first step involved the fixation of the noble metal, e.g. platinum, and the thermal loss of ammonium ion by firing a pelletized catalyst in air. The second step consisting of firing the pellets in an atmosphere of dry hydrogen. Between these two steps, after the air firing, the catalyst was allowed to cool and partially rehydrate prior to the hydrogen treatment. In the hydrogen firing, two variables appear to be significant. These are the rates of heating and the temperature at which the catalyst is heated. In addition, it was noted that rehydration to a water content of about 3 to 10 weight percent gave maximum results for the isomerization of normal hexane.

As can be seen, therefore, the step of rehydration, followed by heating to about 500° C. has been found to be desirable to obtain the best balance between isomerization and cracking activities.

Among the crystalline zeolites which have been found to be useful in the practice of the present invention, zeolite Y, zeolite L, and fauasite are the most important. The chemical formula for zeolite Y expressed in terms of mole oxides may be written as:

$$0.9 \pm 0.2 \ Na_2O:Al_2O_3:xSiO_2:yH_2O$$

wherein "$x$" is a value greater than 3 up to about 6 and "$y$" may be a value up to about 9.

Zeolite Y has a characteristic X-ray powder deffraction pattern which may be employed to identify zeolite Y. The X-ray diffraction data are shown in Table A. The values for the interplanar spacing, $d$, are expressed in angstrom units. The relative intensity of the lines of the X-ray powder diffraction pattern are expressed as VS, very strong; S, strong; M, medium; W, weak; and VW, very weak.

Zeolite Y is described in copending application Serial No. 109,487, filed May 12, 1961 and issued April 21, 1964 as U.S. Patent No. 3,130,006 in the name of D. W. Breck. The description therein is incorporated herein by reference.

TABLE A

| $h^2+k^2+l^2$ | $d$ in A. | Intensity |
|---|---|---|
| 3 | 14.3–14.4 | VS |
| 8 | 8.73–8.80 | M |
| 11 | 7.45–7.50 | M |
| 19 | 5.67–5.71 | S |
| 27 | 4.75–4.79 | M |
| 32 | 4.37–4.46 | M |
| 40 | 3.90–3.93 | W |
| 43 | 3.77–3.79 | S |
| 48 | 3.57–3.59 | VW |
| 51 | 3.46–3.48 | VW |
| 56 | 3.30–3.33 | S |
| 59 | 3.22–3.24 | W |
| 67 | 3.02–3.04 | M |
| 72 | 2.90–2.93 | M |
| 75 | 2.85–2.87 | S |
| 80 | 2.76–2.78 | M |
| 83 | 2.71–2.73 | W |
| 88 | 2.63–2.65 | M |
| 91 | 2.59–2.61 | M |
| 96 | 2.52–2.54 | VW |
| 104 | 2.42–2.44 | VW |
| 108 | 2.38–2.39 | M |
| 123 | 2.22–2.24 | VW |
| 128 | 2.18–2.20 | W |
| 131 | 2.16–2.18 | VW |
| 139 | 2.10–2.11 | W |
| 144 | 2.06–2.07 | VW |
| 164 | 1.93–1.94 | VW |
| 168 | 1.91–1.92 | VW |
| 187 | 1.81–1.82 | VW |
| 195 | 1.77–1.78 | VW |
| 200 | 1.75–1.76 | W |
| 211 | 1.70–1.71 | W |

When an aqueous colloidal silica sol is employed as the major source of silica, zeolite Y may be prepared by preparing an aqueous sodium aluminosilicate mixture having a composition, expressed in terms of oxide-mol ratios, which falls within one of the ranges shown in Table B.

TABLE B

|  | Range 1 | Range 2 | Range 3 |
|---|---|---|---|
| $Na_2O/SiO_2$ | 0.20 to 0.40 | 0.41 to 0.60 | 0.61 to 0.80. |
| $SiO_2/Al_2O_3$ | 10 to 40 | 10 to 30 | 7 to 30. |
| $H_2O/Na_2O$ | 25 to 60 | 20 to 60 | 20 to 60. | maintaining the mixture at a temperature in the range of from about 20° C. to 125° C. until crystals are formed, and separating the crystals from the mother liquor.

When sodium silicate is employed as the major sources of silica, zeolite Y may be prepared by preparing an aqueous sodium aluminosilicate mixture having a composition, expressed in terms of oxide-mole-ratios falling within any one of the ranges shown in Table C.

TABLE C

|  | Range 1 | Range 2 | Range 3 |
|---|---|---|---|
| $Na_2O/SiO_2$ | 0.6 to 1.0 | 1.5 to 1.7 | 1.9 to 2.1. |
| $SiO_2/Al_2O_3$ | 8 to 30 | 10 to 30 | About 10. |
| $H_2O/Na_2O$ | 12 to 90 | 20 to 90 | 40 to 90. |

The crystallization is conducted by holding the reaction mixture in the temperature range of 20° C. to 125° C. until the crystalline product is obtained. In this range it is preferred to use temperature of from 80° C. to 120° C.

Zeolite Y may also be produced, when an aqueous colloidal silica sol is employed as the major source of silica, from the following reactant composition ranged which are expressed in terms of oxide-mole ratios:

*Range I*

$Na_2O/SiO_2$ ---------------------------- 0.28–0.30
$SiO_2/Al_2O_3$ ---------------------------- 8–10
$H_2O/Na_2O$ ---------------------------- 30–50

*Range II*

$Na_2/SiO_2$ ---------------------------- About 0.4
$SiO_2/Al_2O_3$ ---------------------------- 10–27
$H_2O/Na_2O$ ---------------------------- 30–50

The recent mixture is first digested at ambient or room-temperature and then heated to an elevated temperature and maintained at this temperature until sodium zeolite Y has crystallized. The ambient temperature step is preferably carried out for a 24 hour period and the elevated temperature is preferably 100° C.

The composition of zeolite L may stoichiometrically be expressed in terms of mole ratios of oxides. Thus, a general formula for zeolite L may be represented as follows:

$$1.0 \pm 0.1 M_{2/n}O:Al_2O_3:6.4 \pm 0.5 \ SiO_2:yH_2O$$

wherein "M" designates at least one exchangeable cation, as hereinbelow defined; "$n$" represents the valence of "M"; and "$y$" may be any value from 0 to about 7. Minor variations in the mole ratios of these oxides within the ranges indicated by the above formula do not significantly change the crystal structure or physical properties of the zeolite. Likewise, the value of "$y$" is not necessarily an invariant for all samples of zeolite L. This is true because various exchangeable cations are of different size, and as no appreciable modification of the crystal lattice dimensions of the zeolite is effected by the exchange of these particular cations, more or less interstitial space should be available for the accommodation of water molecule. The value of "$y$" therefore depends upon the identity of the exchangeable cation and also upon the degree of dehydration of the zeolite.

The exchangeable cations contemplated by the present invention include mono-, di-, tri-, and tetravalent metal ions, particularly those of Groups I, II, and III of the Periodic Table, as set forth in Webster's New Collegiate Dictionary, 1956 edition, page 626, such as barium, calcium, cerium, lithium, magnesium, potassium, sodium, zinc ions etc. and the like, and other cations, for example, hydrogen and ammonium ions, which with zeolite L behave like the metal ions mentioned above in that they may be replaced for other exchangeable cations without causing a substantial alteration of the basic crystal structure of the zeolite.

In making zeolite L, the usual method comprises dissolving potassium or sodium aluminate and alkali, viz., potassium or sodium hydroxide, in water. This solution is admixed with a water solution of sodium silicate, or preferably with a water-silicate mixture derived at least in part from an aqueous colloidal silica sol. The resultant reaction mixture is placed in a container made, for example, of metal or glass. The container should be closed to prevent loss of water. The reaction mixture is then stirred to insure homogeneity.

For best results, the crystallization procedure is carried out at a temperature of approximately 100° C. The zeolite may, however, be satisfactorily prepared at temperatures of from about 100° C. to about 120° C., the pressure being atmospheric or at least that corresponding to the vapor pressure of water in equilibrium with the mixture of reactants at the higher temperature.

In addition to composition, zeolite L may be identified and distinguished from other zeolites and other crystalline substances by its X-ray powder diffraction pattern, the data for which are set forth below in Tables D and E. In obtaining the X-ray powder diffraction patterns standard techniques were employed. The radiation was the K-alpha doublet of copper, and a Geiger counter spectrometer with a strip chart pen recorder was used. The peak heights, I, and the positions as a function of $2\theta$, where $\theta$ is the Bragg angle, were read from the spectrometer chart. From these the relative intensities, $100\ I/I_0$, where $I_0$ is the intensity of the strongest line or peak, and $d(A.)$ observed, the interplanar spacing in angstrom units, corresponding to the recorded lines were determined.

X-ray powder diffraction data for samples of the potassium form of zeolite L prepared from a potassium alumino-silicate reaction mixture ($K_2L$) and from a potassium-sodium aluminosilicate mixture (K-NaL) are given in Table D below. Also included in Table D are X-ray data for isomorphic forms of zeolite L in which varying proportions of the exchangeable cations originally present in the zeolite had been replaced by other exchangeable cations, viz., a 73.2 percent barium exchanged zeolite L (BaL), a 71.3 percent calcium exchanged zeolite L (CaL), a 28 percent cerium exchanged zeolite L ($Ce_2L_3$), a 39.1 percent magnesium exchanged zeolite L (MgL), a 41.4 percent sodium exchanged zeolite L ($Na_2L$), a 48.3 percent strontium exchanged zeolite L (SrL) and a 22.8 percent zinc exchanged zeolite L (ZnL).

zeolite L. The patterns show substantially all of the same lines, and all meet the requirements of a unit cell of approximately the same size. The spatial arrangement of silcon, oxygen, and aluminum atoms, i.e., the arrangement of the $AlO_4$ and $SiO_4$ tetrahedra, are essentially identical in all forms of zeolite L. The appearance of a few minor X-ray lines and the disappearance of others from one cation form of zeolite L to another, as well as slight changes in positions and intensities of some of the X-ray lines, may be attributed to the different sizes and numbers of exchangeable cations present in the various forms of the zeolite.

The more significant $d(A.)$ values, i.e., interplanar spacings, for zeolite L are given below in Table E.

TABLE E

| | |
|---|---|
| 16.1±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

EXAMPLE I (a) *Preparation of a decationized molecular sieve zeolite*

A 22 liter, 3-necked glass flask, equipped with a mechanical stirrer, reflux condenser, and thermometer, and heated by means of a heating mantle, was charged with 12 liters of distilled water and 4400 grams of ammonium chloride. The temperature was raised to 30° C. to dissolve all of the ammonium chloride. To this stirred solution there was charged 6000 grams of a sodium Y molecular sieve zeolite (containing 23 equivalents of sodium cations), having the following composition:

| | Found, by weight percent | Calculated to anhydrous basis, percent |
|---|---|---|
| $Na_2O$ | 8.8±0.3 | 11.8 |
| $Al_2O_3$ | 16.6±0.5 | 21.1 |
| $SiO_2$ | 48.7±0.5 | 65.0 |

Loss on ignition ($H_2O$) = 25.1% ±0.3.

Calculated molar ratios:
$SiO_2:Al_2O_3$ _____ 5.0
$Na_2O:Al_2O_3$ _____ 0.88

TABLE D

| $2\theta$ | $d(A.)$ | $100\ I/I_0$ | | | | | | | | |
|---|---|---|---|---|---|---|---|---|---|---|
| | | $K_2L$ | K-NaL | BaL | CaL | $Ce_2L_3$ | MgL | $Na_2L$ | SrL | ZnL |
| 5.6 | 15.8 | 100 | 100 | 100 | 100 | 100 | 100 | 100 | 100 | 100 |
| 11.2 | 7.89 | 14 | 6 | 38 | 10 | 38 | 12 | 9 | 12 | 15 |
| 11.8 | 7.49 | 15 | 14 | 62 | 31 | 94 | 24 | 25 | 41 | 32 |
| 14.8 | 5.98 | 25 | 16 | 56 | 33 | 94 | 29 | 21 | 44 | 38 |
| 15.4 | 5.75 | 11 | 6 | 31 | 18 | ---- | 16 | 14 | 12 | 32 |
| 19.4 | 4.57 | 32 | 30 | 69 | 37 | 75 | 33 | 34 | 34 | 65 |
| 20.2 | 4.39 | 13 | 13 | 38 | 16 | 63 | 12 | 13 | 32 | 18 |
| 20.5 | 4.33 | 13 | 19 | 38 | 29 | 69 | 22 | 23 | 50 | 35 |
| 22.7 | 3.91 | 30 | 35 | 56 | 33 | 81 | 39 | 34 | 63 | 47 |
| 23.4 | 3.78 | 13 | 13 | 13 | 12 | 38 | 14 | 12 | 16 | 18 |
| 24.3 | 3.66 | 19 | 18 | 50 | 22 | 56 | 20 | 16 | 32 | 29 |
| 25.6 | 3.48 | 23 | 21 | 62 | 22 | 50 | 24 | 25 | 41 | 38 |
| 27.3 | 3.26 | 14 | 23 | 25 | 22 | 25 | 20 | 21 | 28 | 38 |
| 28.1 | 3.17 | 34 | 48 | 100 | 47 | 88 | 51 | 46 | 56 | 56 |
| 29.1 | 3.07 | 22 | 27 | 50 | 22 | 63 | 29 | 29 | 41 | 38 |
| 29.6 | 3.02 | 15 | 14 | 38 | 10 | 25 | 12 | 11 | 31 | 12 |
| 30.7 | 2.91 | 23 | 27 | 62 | 31 | 81 | 29 | 29 | 56 | 44 |
| 33.8 | 2.65 | 19 | 18 | 44 | 16 | 69 | 22 | 21 | 31 | 32 |
| 44.2 | 2.62 | 8 | 16 | 31 | 8 | 38 | 14 | 11 | 12 | 12 |
| 35.5 | 2.53 | 8 | 6 | 25 | 4 | 38 | 6 | 5 | 12 | 6 |
| 36.6 | 2.45 | 9 | 10 | 19 | 6 | 44 | 6 | 9 | 22 | 12 |
| 37.1 | 2.42 | 11 | 10 | 25 | 4 | 25 | 10 | 7 | 22 | 9 |
| 41.2 | 2.19 | 11 | 10 | 25 | 10 | 56 | 12 | 11 | 28 | 12 |

The positions and relative intensities of the X-ray lines are only slightly different for the various cation forms of Surface area of the sodium zeolite Y following a Braunauer, Emmett, Teller method for determining the surface area of a molecular sieve using nitrogen adsorption was found to be 532 meters$^2$/gram of molecular sieve.

The resulting slurry was then heated to a reflux temperature (106° C. to 110° C.), held for three hours, and filtered with suction. Analysis of a portion of this material, after thorough washing, showed the Na$_2$O content to be 4.1 weight percent on an anhydrous basis.

The filtered material was then re-slurried in the same quantity of ammonium chloride solution and the procedures repeated. Analysis showed the Na$_2$O content to be 3.2 percent. The procedures were then repeated on the twice-exchanged filtered material. The three-times exchanged zeolite was then slurried in approximately 5 gallons of distilled water and pumped into a filter press.

An additional 10 gallons of distilled water were pumped through the material to remove soluble salts until the removed water gave a negative test for chloride ions with a silver nitrate reagent. The washed material was then dried at 125° C. and the precipitate was broken up mechanically and allowed to re-equilibrate with the water vapor of the air. The material had the following analysis:

|  | Found, weight percent | Calculated to anhydrous basis, weight percent |
|---|---|---|
| Na$_2$O | 1.8±0.1 | 2.4 |
| (NH$_4$)$_2$O | 7.1±0.2 | 9.45 |
| Al$_2$O$_3$ | 17.9±0.5 | 23.8 |
| SiO$_2$ | 51.5±0.5 | 68.7 |

Calculated molar ratios:
SiO$_2$:Al$_2$O$_3$ _____ 4.92
Na$_2$O:Al$_2$O$_3$ _____ 0.165
(NH$_4$)$_2$O:Al$_2$O$_3$ _____ 0.78

(b) *Pt(NH$_3$)$_4^{+2}$ ion exchange of the above material*

In a 22-liter, 3-necked flask, equipped with a mechanical stirrer and dropping funnel, there was charged 5,400 grams of the material prepared above and 7 liters of distilled water. (The percent solids content of this material at the start of this preparation was found to be 67.6 percent=32.4 percent loss on ignition. Therefore, the weight of zeolite minus water and ammonia charged was 3,650 grams.) To this stirred slurry a 7-liter volume of aqueous solution of Pt(NH$_3$)$_4$Cl$_2$—H$_2$O was added slowly, from the dropping funnel. The platinum compound employed contained 56.2 percent±0.4 platinum by analysis.

A total of 33.0 grams of Pt(NH$_3$)$_4$Cl$_2$—H$_2$O which is equivalent to 0.5 weight percent Pt on the zeolite product was employed.

The rate of addition of the solution of

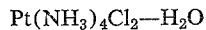

Pt(NH$_3$)$_4$Cl$_2$—H$_2$O was 1.4 liters per hour.

When addition of the Pt(NH$_3$)$_4$Cl$_2$—H$_2$O solution was complete, stirring was continued for 16 to 17 hours. The slurry was then filtered with suction. The filtered material was re-slurried in 6 liters of distilled H$_2$O and filtered by suction and washed. This procedure was again repeated. The filtrate, after the second washing, gave a negative test for Cl$^-$ with AgNo$_3$ reagent. The filtered material from the second washing was dried in an oven at 125° C. granulated by forcing through a U.S. Standard 20 mesh screen, and converted into tablets in a pellet press. The size of the tablets formed were 3/16-inch in diameter and 1/16-inch thick. The weight of the tablets was 4,640 grams (25.5 weight percent loss on ignition=3,560 grams solids). The volume was 5,900 cc's. Approximately 111,000 tablets were formed.

The following analytical results were obtained:

|  | Found, weight percent | Calculated to anhydrous basis, weight percent |
|---|---|---|
| Pt | 0.37±0.2 | [1] 0.46 |
| Cl$^-$ | 0.03±0.02 |  |
| Na$_2$O | 1.9±0.2 | 2.34 |
| (NH$_4$)$_2$O | 7.3±0.1 | 9.0 |
| Al$_2$O$_3$ | 18.3±0.4 | 20.6 |
| SiO$_2$ | 53.1±0.5 | 65.5 |
| LOI | 26.2±0.4 |  |

SiO$_2$:Al$_2$O$_3$ molar ratio=4.90. Surface area—510 M$_2$/g.
[1] On a solids basis (LOI).

(c) *Activation (Decationization) of above Pt(NH$_3$)$_4^{+2}$ exchanged NH$_4^+$-exchanged Y molecular sieve*

A total of 1,775 grams (2,200 cc.) of the above tablets were placed in an electric oven set to control at 550° C. Approximately 3 hours was required to bring the sample temperature to 500–520° C. This temperature was maintained for an additional 5 hours. The fired tablets were then removed and allowed to re-equilibrate with the water vapor of the air overnight. The weight was 1,430 grams, volume=1,950 cc. The percentage of solids was determined by loss on ignition at 750° C. for the rehydrated pellets and was found to be 91.3 percent.

A small sample of the fired tablets was fully rehydrated and submitted for analysis:

|  | Found, weight percent | Calculated to anhydrous basis, weight percent |
|---|---|---|
| Na$_2$O | 2.1±0.1 | 2.6 |
| Al$_2$O$_3$ | 20.2±0.3 | 24.8 |
| SiO$_2$ | 58.8±0.3 | 72.0 |
| LOI | 18.3±0.3 |  |
| Pt | 0.41±0.05 | 0.5 |
| Cl$^-$ | less than 0.05 |  |
| N | less than 0.3 |  |

SiO$_2$:Al$_2$O$_3$ molar ratio=4.95.
B.E.T.—N$_2$ surface area—416 M$^2$/g.

EXAMPLE II

*Preparation of 1.0 weight percent platinum loaded NH$_4$Y*

In a 3 liter, 3-necked flask equipped with a mechanical stirrer and dropping funnel, there was charged 150 grams of the material as prepared in Example I(a). The percent solids content of this material at the start of this preparation was found to be 78.0 percent which equaled a 2.0 percent loss on igniton. Therefore, the weight of zeolite minus water and ammonia charged was 117 grams and 600 mls. of distilled water. To this stirred slurry an aqueous solution of Pt(NH$_3$)$_4$Cl$_2$.H$_2$O in 600 ml. of water was added slowly from the dropping funnel.

A total of 2,108 grams of Pt(NH$_3$)$_4$Cl$_2$.H$_2$O to be equivalent to 1.0 weight percent Pt on the final product was employed.

The rate of addition of the solution of

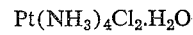

Pt(NH$_3$)$_4$Cl$_2$.H$_2$O was 600 mls. per 1.5 hours.

When addition of the Pt(NH$_3$)$_4$Cl$_2$.H$_2$O solution was complete, stirring was continued for two (2) hours. The slurry was then filtered with suction. The filter material was re-slurried in 500 mls. of distilled water and filtered by suction. This procedure was again repeated. The filtrate after the second washing, gave a negative test for Cl⁻ with AgNO₃ reagent. The filter material from the second washing was dried in an oven at 125° C., granulated by forcing through a U.S. Standard 20 mesh screen and converted into tablets in a pellet press. To improve the physical characteristic of the pellets, catalytically inert material may be added.

EXAMPLE III

*Preparation of a 0.5 weight percent Pd loaded NH₄Y*

In a 5 liter, 3-necked flask, equipped with a mechanical stirrer and dropping funnel, there was charged 422 grams of the material as prepared in Example I(a) into 2 liters of water. The percent solids content of this material at the start of this preparation was found to be 71.1 percent which equaled 28.9 percent loss on ignition. Therefore, the weight of zeolite minus water and ammonia charged was 300 grams. To this stirred slurry, a 1 liter aqueous solution of $Pd(NH_3)_4Cl_2$ was added slowly from the dropping funnel. This salt contained 41.6 percent Pd by analysis.

A total of 3.36 grams of $Pd(NH_3)_4Cl_2$ which is equivalent to 0.5 weight percent Pd on the catalyst product was employed.

The rate of adfdition of the solution of $Pd(NH_3)_4Cl_2$ was 1.0 liter per hour.

When additon of the $Pd(NH_3)_4Cl_2$ solution was complete, stirring was continued for two (2) hours. The slurry was then filtered with suction. The filter material was re-slurried in 2 liters of distilled water and filtered by suction. This procedure was again repeated. The filtrate, after the second washing, gave a negative test for Cl⁻ with AgNO₃ reagent. The filter material from the second washing was dried in an oven at 125° C., granulated by forcing through a U.S. Standard 20 mesh screen,, and converted into tablets in a pellet press.

EXAMPLE IV

*Preparation of a 0.5 weight percent Rh loaded NH₄Y*

In a 3 liter, 3-necked equipped with a mechanical stirrer and dropping funnel, there was charged 422 grams of the material as prepared in Example I(a). The percent solids content of this material at the start of this preparation was found to be 71.1 percent which equaled 28.9 percent loss on ignition. Therefore, the weight of Molecular Sieve minus water and ammonia charged was 300 grams and 1.0 liter of distilled H₂O. To this stirred slurry, a 900 ml. aqueous solution of $Rh(en)_3Cl_3$ was added slowly from the dropping funnel (en means ethylenediamine). This salt contained 26.4 percent Rh by analysis.

A total of 5.6818 grams of $Rh(en)_3Cl_3$ which is equivalent to 0.5 weight percent Rh on the catalyst product was employed.

The rate of addition of the solution of $Rh(en)_3Cl_3$ was 900 mls, per 1.5 hours.

When addition of the $Rh(en)_3Cl_3$ solution was complete, stirring was continued for two (2) hours. The slurry was then filtered with suction. The filter material was re-slurried in distilled water and filtered by suction. This procedure was again repeated. The filtrate, after the second washing, gave a negative test for Cl— with AgNO₃ reagent. The filter material from the second washing was dried in an oven at 125° C., granulated by forcing through a U.S. Standard 20 mesh screen and converted into tablets in a pellet press.

As has been pointed out heretofore, the catalytic activity of the catalysts of this invention for hydrocarbon converting reactions is superior to the catalytic activity of the non-crystalline aluminosilicates and the crystalline metal aluminosilicates having a silica-to-alumina molar ratio of 3 or less. The superior activity in most hydrocarbon converting reactions can be beneficially utilized to conduct the reaction at a lower temperature than heretofore except in some instances wherein the prior art employed relatively large amounts of corrosive, acidic activators. It should not be inferred from this that the new catalysts must not under any circumstances have added thereto or to the reactant feed some Lewis acid type halide containing activator. When desired for special effect, activators may be employed. The benefit achieved through the addition of an activator will vary with changes in feed compositions, temperature of reaction, moisture or other impurity in the feed, and the like. In some instances such as in hydrocracking, hydroisomerization and hydrodealkylation the activation may be employed to assist in reaching stable operating conditions more quickly and easily.

The unique activity of the crystalline decationized zeolites for hydrocarbon conversion processes is illustrated by the following examples:

CATALYTIC CRACKING

The aim of the cracking processes including catalytic cracking and hydrocracking is to produce gasoline from hydrocarbon fractions boiling above the gasoline range. In a few cases the product desired is a specific gaseous hydrocarbon compound such as ethylene, propylene, and the like.

The conventional catalytic cracking process is carried out at almost atmospheric pressure (8–20 p.s.i.g.) at 470–510° C. on fluid or moving catalyst beds. In once-through operation only 55–60 percent gasoline-containing product is produced. Therefore, the unconverted fraction boiling above 200° C. has to be recycled.

The prior art catalytic cracking catalysts split the large hydrocarbon molecules and also isomerize the split small molecules. They do not isomerize, however, the feed components. The lack of activity in isomerizing the paraffin hydrocarbons without splitting the C—C bond is characteristic of all known catalytic cracking catalysts. This property is disadvantageous, however, since the iso-paraffins can be cracked more easily. Due to the lack of isomerization activity for the feed components, the feed is degraded by dehydrogenation and thermal cracking during the cracking process. Since, in once-through operation, only 55–60% of the heavy boiling feed is converted, recycle operation is used to increase the gasoline yield. Because of the degradation of the feed and the build-up of the aromatic content, however, a susbtantial quantity of the recycled oil cannot be further cracked and has to be disposed of as cheap by-product.

Table II, below, shows the catalytic cracking performance of decationized zeolite Y and compares this activity with the performance data of a representative commercial cracking catalyst having a $SiO_2/Al_2O_3$ molar ratio of approximately 11. The data shows that the decationized zeolite Y catalyst produced more gasoline at 130–185° C. lower temperatures than the amorphous reference catalyst. The amorphous catalyst had substantially no activity at below 400° C.

The composition of the gas products indicates that the decationized zeolite Y catalyst produces only a negligible quantity of $C_1$ and $C_2$. The high $C_1+C_2$ yield from the amorphous catalyst shows low selectivity and also a lower efficiency since their presence indicates thermal decomposition of the feed. Similarly the large hydrogen quantity in the product gas of the amorphous catalyst indicates disadvantageous dehydrogenation of the feed which leads to deterioration of the recycle oil. Thus, it is clear from this data that the present catalyst is a superior cracking catalyst.

TABLE II

*Atmospheric pressure cracking with non-metal-loaded catalyst*

| Catalyst | Amorphous reference | Catalyst [1] | NH$_4$(89%) Y [2] | NH$_4$(89%) Y [2] |
|---|---|---|---|---|
| Raw material | ([3]) | ([3]) | ([3]) | ([3]) |
| Equilibrium temperature, °C | 450 | 480 | 375 | 325 |
| Pressure, p.s.i. | atmos. | atmos. | atmos. | atmos. |
| W.H.S.V., space velocity | 2.4 | 2.0 | 2.0 | 2.0 |
| Mass balance, wt. percent feed | 93.5 | 84.1 | 67.8 | 66.3 |
| Length of run, min | 166 | 35 | 35 | 30 |
| Liquid yield, vol. percent of feed | 93.8 | 68.6 | 46.3 | 51.4 |
| Liquid yield, wt. percent of feed | 88.0 | 64.9 | 42.2 | 59 |
| Liquid analysis, vol. percent (IBP to 400° F. cut): | | | | |
|   Paraffins and naphthenes | 62 | 52 | 62 | |
|   Olefins | 7 | 4 | 2 | |
|   Aromatics | 31 | 44 | 36 | |
| ASTM distillation, °F.: | | | | |
|   Start | 88 | 100 | 83 | 84 |
|   10% volume | 226 | 208 | 137 | 136 |
|   20% | 357 | 308 | 188 | 183 |
|   30% | | 362 | 238 | 234 |
|   40% | 430 | 398 | 284 | 283 |
|   50% | 457 | 425 | 330 | 333 |
|   60% | 480 | 457 | 390 | 392 |
|   70% | 504 | 480 | 438 | 442 |
|   80% | 508 | 509 | 486 | 486 |
|   90% | 540 | 542 | 534 | 539 |
|   End point | 544 | 547 | 537 | 540 |
|   Recovery, vol. percent | 93 | 96.5 | 92.5 | 93.5 |
|   Loss, vol. percent | 3.5 | 1 | 4 | 4.5 |
|   Residue, vol. percent | 3.5 | 2.5 | 3.5 | 2.0 |
| Liquid specific gravity, 60° F./60° F. | 0.824 | 0.830 | 0.783 | 0.773 |
| Gasoline boiling to 400° F. in product, vol. percent | 35.0 | 42.0 | 62.0 | 62.0 |
| Moles of gas formed | 1.16 | 0.7634 | 0.7607 | 0.7500 |
| Wt. percent gas formed of total input | 5.4 | 18.6 | 25.7 | 20.2 |
| Gas analysis, vol. percent: | | | | |
|   H$^2$ | 34.7 | 43.2 | 12.3 | 11.8 |
|   CH$^4$ | 11.2 | 10.3 | 1.7 | 0.3 |
|   Ethane | 6.7 | 5.9 | 1.4 | 0.3 |
|   Propane | 17.7 | 12.8 | 28.0 | 23.6 |
|   Iso-butane | 15.3 | 12.1 | 31.4 | 35.0 |
|   n-Butane | 4.2 | 3.2 | 7.9 | 7.6 |
|   Butene | 2.7 | 4.5 | | |
|   Iso-pentane | 4.4 | 4.5 | 11.7 | 14.0 |
|   n-Pentane | 0.5 | 0.9 | 1.6 | 2.0 |
|   Pentene | 0.8 | 0.8 | | |
|   2,2-dimethylbutane | | | 0.1 | 0.1 |
|   2-methylpentane | 0.7 | 0.9 | 1.9 | 2.9 |
|   3-methylpentane | 0.3 | 0.4 | 1.0 | 0.9 |
|   n-Hexane | 0.1 | 0.3 | 0.4 | 0.7 |
|   +C$^6$ | 0.7 | 0.3 | 0.5 | 0.4 |

[1] SiO$_2$–Al$_2$O$_3$ composite having a ratio of SiO$_2$Al$_2$O$_3$ of approximately 11.
[2] Decationized Y.
[3] #2 fuel oil (sp. gr.=0.843 60/60).

The process conditions for the cracking reaction using decationized zeolite Y are:

| | Broad range | Preferred range |
|---|---|---|
| Temperature, °C | 200–600 | 250–450 |
| Pressure, p.s.i.g. | 0–200 | 0–20 |
| Space velocity, g./g./hr | 0.5–5 | 1–2 |

HYDROCRACKING

The major difference between catalytic cracking and hydrocracking is in the application of a considerably higher hydrogen partial pressure in the hydrocracking process. Generally, metals with catalytic hydrogenation activity are preferably incorporated into the hydrocracking catalysts. These components reduce the tendency for coke to accumulate on the catalyst, hence increase the catalyst life.

The performance data of the decationized zeolite Y catalysts for hydrocracking n-hexane, are shown in Table III. Similar data obtained with an amorphous commercial cracking catalyst are also shown. The hydrocracking experiments were run in the same reactors used for catalytic cracking while operating at a total hydrogen plus hydrocarbon pressure of 450 p.s.i.g. and a hydrogen-to-hydrocarbon molar ratio of 3–5:1.

The performance data show that the decationized zeolite Y catalyst converts more of the feed at lower temperatures than the amorphous reference catalyst. At the same level of conversion, the production of branched-chain isomers of the feed was substantially higher using the present catalyst. This isomerization of the feed leads to a higher octane product boiling in the useful gasoline range.

TABLE III

*Comparison of hydrocracking activity of decationized zeolitic molecular sieve with a commercial cracking catalyst*

| Catalyst | 85% decationized zeolite Y | | Commeial SiO$_2$–Al$_2$O$_3$ * cracking catalyst | |
|---|---|---|---|---|
| Feed | n-C$_6$ | n-C$_8$ | n-C$_6$ | n-C$_8$ |
| Temp. °C | 335 | 250 | 475 | 450 |
| Conversion, mol percent | 61.6 | 22.6 | 49.6 | 18.1 |
| Liquid analysis, Mol percent: | | | | |
|   n-Hexane | 38.4 | 0.3 | 50.4 | 0.3 |
|   3-methylpentane | 10.2 | 0.3 | 2.6 | 0.4 |
|   2,3-dimethylbutane+2-methylpentane | 18.5 | 0.7 | 3.8 | 0.6 |
|   2,2-dimethylbutane | 7.5 | | None | 0.4 |
|   n-Pentane | 1.6 | 0.5 | 0.8 | 1.3 |
|   Isopentane | 6.2 | 4.2 | 2.8 | 4.4 |
|   n-Butane | 3.1 | 2.5 | 3.3 | 3.8 |
|   Isobutane | 11.6 | 8.2 | 7.9 | 4.7 |
|   Propane | 8.5 | 1.5 | 25.7 | 1.5 |
|   n-Octane | | 77.4 | | 81.9 |

* SiO$_2$–Al$_2$O$_3$ composite having an SiO$_2$/Al$_2$O$_3$ ratio of approximately 11

The hydrocracking activity of decationized zeolite Y, loaded with various quantities of catalytically active metals from the platinum group by ion-exchange technques, under various process conditions is shown in Table IV. The zeolite was the same for each catalyst, i.e., 88 percent ammonium exchange zeolite Y having a silica-to-alumina molar ratio of 4.9. After metal loading, the catalysts were tableted and activated (decationized and dehydrated) by heating to 500–520° C. in air. The feed stock was a No. 2 fuel oil with a distillation end point of above about 580° F. that contained about 30 vol-percent aromatics.

The data of Table IV that as the active metal content is increased, the catalysts are more active and lower temperatures may be employed to achieve higher yields of gasoline. However, above about 2 wt.-percent metal content the improvements are not necessarily sufficient to warrant the increased expense.

olefins. The alkylation process is preferably carried out at temperatures of 20–300° C., at pressures of atmospheric to 1000 p.s.i.g., particularly atmospheric to 700 p.s.i.g., for the non-metal loaded catalyst of the present invention. The metal-loaded catalyst of the present invention will generally operate at lower temperatures than the non-metal loaded catalyst and yield a greater amount of polyalkylated products.

The examples described below illustrate the catalytic activity of the crystalline decationized zeolite catalysts in alkylation reaction.

In a 500 ml., 3-necked flask, equipped with a thermometer, reflux condenser, gas inlet tube and magnetic stirring bar, was charged 163 g. (2.1 moles) benzene and 10.0 g. of powdered decationized zeolite Y catalyst.

TABLE IV

*Effect of metal-content and process conditions on hydrocracking activity of metal-loaded decationized zeolite Y*

| Catalyst: Active metal | Pd | | | | | | | | Pt 1.0 |
|---|---|---|---|---|---|---|---|---|---|
| Metal content, wt. percent | 0.05 | 0.5 | | 1.0 | 1.0 | 3.0 | | 3.0 | |
| Process Conditions: | | | | | | | | | |
| Reactor temperature, °C | 380 | 280 | 285 | 305 | 250 | 250 | 250 | 265 | 290 |
| Pressure, p.s.i.g | 450 | 450 | 450 | 450 | 450 | 1,000 | 450 | 450 | 1,000 |
| H₂ to feed, mol:mol | 5 | 5 | 20 | 10 | 20 | 10 | 10 | 10 | 10 |
| W.H.S.V., g./g./hr | 2 | 2 | 2 | 4 | 2 | 2 | 2 | 2 | 2 |
| Hours on stream | 41 | 36 | 262 | 288 | 53 | 74 | 48 | 139 | 125 |
| Liquid Product: | | | | | | | | | |
| Yield, vol. percent of feed | 98 | 104 | 85 | 93 | 102 | 107 | 107 | 101 | 101 |
| Sp. gr., 60/60° F | 0.803 | 0.756 | 0.689 | 0.734 | 0.776 | 0.742 | 0.754 | 0.742 | 0.734 |
| 400° F. gasoline, vol. percent | 38 | 58 | 87 | | 58 | 76 | 79 | 84 | 68 |

The hydrocracking is preferably carried out at temperatures of 150–475° C., particularly 250°–400° C., at pressures of 300–3000 p.s.i.g., particularly 400–1500 p.s.i.g., at weight-hour space velocities of 0.5–5.5, particularly 1–3, and at a hydrogen to hydrocarbon mole ratio of 5–40, particularly 10–20, for the metal loaded catalyst of the present invention. When the non-metal loaded catalyst of the present invention is employed, the hydrocracking is preferably carried out at temperatures of 300–600° C., particularly 400–500° C., at pressures of 300–3000 p.s.i.g., particularly 400–1500 p.s.i.g., at weight-hour space velocities of 0.5–1, and at a hydrogen to hydrocarbon mole ratio of 1–5, particularly 3. Palladium and platinum are the preferred loaded metals for the hydrocracking process, palladium being particularly preferred.

ALKYLATION

The ability of crystalline decationized zeolite Y to catalyze alkylation reactions is particularly unique. It is generally an accepted fact that this type reaction, which may be illustrated by the addition of olefins to aromatic-ring containing compounds, occurs through an ionic-type reaction mechanism. Heretofore, only strong mineral and Lewis-type acids have been found to be effective catalysts. The ability of our zeolite catalysts is not only unique, but advantageous, since many of the difficulties encountered in the use of the corrosive strong acid catalysts are not prevalent with the non-corrosive zeolite catalysts. For example, the zeolite catalysts are readily removed from the reaction mixture in liquid-phase alkylations by simple filtration or centrifugation. Furthermore, they are readily adaptable to either liquid-phase or vapor-phase alkylations, thereby increasing process flexibility.

In this embodiment of the present invention, isoparaffins and aromatics can be alkylated. Typical of the feed stocks for such a conversion process are iso $C_4$–$C_6$ paraffins plus gaseous $C_2$–$C_6$ olefins or aromatic hydrocarbons such as benzene and substituted benzenes such as phenol and chlorobenzene plus gaseous and liquid $C_2$–$C_{15}$ Propylene gas was then admitted through the gas inlet tube below the surface of the stirred catalyst-benzene slurry at a rate of 100–450 cc./min. The rate of addition was monitored through a gas flowmeter. The rate of the exit gas flow was similarly monitored. The addition was continued for 4 hours during which time the temperature of the slurry rose from 25° C. to 107° C., without any external heating, and started to fall. Conversion of the propylene gas was essentially complete during the reaction period as evidenced by no flow of gases through the exit gas flowmeter. The gain in weight of the contents of the reaction flask was 125 g. (3.0 moles of propylene). The reaction product-catalyst slurry was filtered with suction. The weight of the recovered catalyst was 19.0 g. (9.0 g. loading of products). No attempt was made in this run to reuse the catalyst. However, in another test, a similarly recovered catalyst was desorbed by heating to 200–300° C. under a vacuum of 1.0–2.0 mm. of Hg. The activity of the recovered catalyst was the same as the fresh catalyst.

Fractional distillation of the clear, light yellow filtrate yielded the following fractions:

| Component | Weight, g. | $n_D^{20}$ | $n_D^{20}$ (Lit. value) |
|---|---|---|---|
| Benzene | 36 | 1.4978 | 1.5015 |
| Isopropylbenzene | 53 | 1.4909 | 1.4915 |
| Diisopropylbenzene | 186 | 1.4895 | |
| Unidentified | 4 | White crystals | |

|  | Percent |
|---|---|
| Conversion (based on propylene) | 100 |
| Conversion (based on benzene) | 78 |
| Yield of isopropylbenzene (of total alkylbenzenes) | 21.8 |
| Yield of diisopropylbenzene (of total alkylbenzenes) | 76.5 |
| Yield of others | 1.7 |

Infrared analysis of the diisopropylbenzene fraction showed the presence of the 1,2-, 1,3- and 1,4-substituted isomers with the 1,4-isomer in greatest concentration.

In a similar manner, 156 g. of benzene (2.0 moles) and 10.0 g. of powdered decationized zeolite Y containing 0.5 wt. % Pd loaded by the ion-exchange technique were charged to a similar flask. The gain in weight of the contents of the reaction flask was 142 g. (3.4 moles of propylene). The reaction product-catalyst slurry was filtered with suction. The weight of the recovered catalyst was 19.0 g. (9.0 g. loading of products). Fractional distillation of the clear filtrate yielded the following fractions:

Component:
    Benzene _____wt., g.___   25
    Isopropylbenzene _____wt., g.___   60
    Diisopropylbenzene _____wt., g.___  187
    Unidentified (white solid) _____wt., g.___    5
    Conversion (based on propylene) __percent___  100
    Conversion (based on benzene) ____percent___   84
Yield, wt. percent of total alkylate:
    Isopropylbenzene _____   23.8
    Diisopropylbenzene _____   74.2
    Others _____    2.0

A 75% ammonium exchanged zeolite X molecular sieve was decationized, i.e., $NH_3$ and $H_2O$ driven from the zeolite by heating in air to 500° C. and used as a catalyst for the alkylation of benzene with propylene. The catalyst was not rehydrated after decationization so, although a large portion of the crystallinity was lost, some, probably less than 50%, was retained. The same procedures were used as in the decationized zeolite Y catalyzed reaction. Whereas large amounts of diisopropyl substituted benzenes were produced by the decationized zeolite Y, only a trace of isopropylbenzene was formed by the decationized zeolite X catalyst even though the reaction slurry was heated to the reflux temperature for over one-half hour. No external heating was required with the decationized zeolite Y catalyst.

The same general procedure was used as described in the above examples.

To a stirred slurry of 159 g. (2 moles) of benzene and 30 g. of decationized zeolite Y was charged isobutylene at a rate of 250–500 cc./min. at atmospheric pressure for a period of 5 hours. The temperature of the slurry rose from 20° C. to 113° C., then started to fall near the end of the addition. No external heat was applied. The following products were obtained after removal of the catalyst by filtration:

| Fraction | Weight, g. | Composition |
|---|---|---|
| I | 25.0 | Benzene. |
| II | 7.0 | Isobutylene dimer. |
| III | 53.0 | t-Butylbenzene—pure by IR analysis. |
| IV | 267 | Higher boiling product. |

Fraction IV was further separated by fractional distillation at reduced pressure.

Fraction IVA B.P. 53–56° C./0.3 mm. of Hg.—35% of IV.

Fraction IVB B.P. 80–85° C./0.3 mm. of Hg.—65% of IV.

Infrared analysis of IVA showed mainly 1,3- and 1,4-disubstituted benzenes, one group of which was t-butyl, but the other either methyl or ethyl. Fraction IVB was mainly 1,4-di-t-butylbenzene.

It is generally recognized that it is more difficult to alkylate benzene with ethylene than it is with alkyl-substituted, higher molecular weight olefins. Higher activation energy is necessary.

In a manner similar to the above examples, 39 g. (0.5 moles) of benzene and 5.0 g. of decationized zeolite Y were charged to a flask. Enough ethylene was charged, based on pressure-volume-temperature relationships, to give a benzene-to-ethylene molar ratio of approximately 1. The flask was then heated. At a temperature of 190° C.–200° C. (pressure—730 p.s.i.g.) reaction started and was evidenced by a rapid pressure drop to 200 p.s.i.g. in 1 hour (Temp.=220° C.). On cooling to room temperature, the pressure fell to 0 p.s.i.g. The liquid recovery was 111.4 vol. percent; 109 wt. percent. Chromatographic analysis of the liquid product showed 54 mole percent benzene and 30 mole percent ethylbenzene. The remainder was mainly di- and triethylbenzenes.

The following example illustrates the alkylation of aromatic compounds that contain electron donating groups other than alkyl-substituents. It also illustrates the advantageous feature of the decationized zeolite Y catalyst in that formation of undesirable side-products which generally accompany mineral acid or Lewis acid catalyzed alkylations did not occur. The procedure was generally the same as described in the above examples.

To a stirred slurry of 94 g. (1.0 mole) of phenol and 30.0 g. of decationized zeolite Y was charged propylene gas at a rate of 150–200 cc.³/min. The temperature of the slurry gradually rose to 60° C. without external heating with approximately 50% conversion of the propylene. External heat was then applied and the temperature slowly raised to 170° C. At this temperature all of the propylene, added at a rate of over 500 cc.³/min. was consumed. Near the end of the addition, 3 hours, the color of the slurry suddenly changed from light yellow to dark red and the conversion of the propylene sharply declined. The gain in weight was 88 g. (2.1 moles of propylene).

The reaction product was filtered with suction to remove the catlyst and the catalyst was washed with acetone to remove adsorbed product. An X-ray diffraction pattern of the recovered catalyst showed no change (complete retention of) in crystallinity. Removal of the solvent (wash) by distillation yielded 172 g. of light yellow, clear reaction product. Distillation of this material yielded 170 g. of product distilling at 75–97° C./0.5 mm. of Hg $n_D^{20}$=1.5138. All of the phenol was reacted. Infrared analysis of the product showed it to be a mixture of diisopropylphenol isomers, mainly 1,2,4- and 1,3,5-substituted.

To show more clearly the unique catalytic activity of the present catalyst, even at lower percentages of decationization, over other zeolites, zeolite X and zeolite Y were tested for alkylation activity. Each of these zeolites was ammonium ion exchanged and then decationized so that each catalyst was 30–35% decationized. Decationization was effected by heating the two ammonium ion exchanged zeolites in an oven purged with dry air from room temperature to 520° C. over a 4 hour period and then holding the 520° C. temperature for an additional three hours. The zeolites were kept anhydrous after this treatment. X-ray analysis showed full retention of zeolite crystallinity in both samples.

The catalyst samples were evaluted by charging 156 g. (2.0 moles) of benzene and 30.0 g. of catalyst (powder) in a 500 ml., 3-necked flask, equipped with thermometer, reflux condenser, gas inlet tube and magnetic stirring bar. The system was flushed with dry nitrogen and propylene gas admitted through the gas inlet tube below the surface of the stirred catalyst-benzene slurry at a rate of 100–200 ccs./min. The extent of catalytic activity was measured by the duration of the exothermic reaction, the temperature rise and the gain in weight of the reaction slurry. The runs were stopped when the temperature started to drop.

The results of the tests are summarized below:

| Catalyst | 30-35% decationized X | 30-35% decationized Y |
|---|---|---|
| Duration of exothermic reaction, hr. | 0.5 | 2 |
| Temperature rise, °C. | 3 | 15 |
| Weight-gain, g. | 1.0 | 10.0 |

These results show that decationized zeolite X had no alkylation activity even where the decationization step does not destroy the crystal structure. Only a trace of cumene was detected in the reaction product by vapor phase chromatographic analysis. The slightly exothermic reaction with the decationized zeolite X catalyst was due, for the most part, to the heat of adsorption of the strongly adsorbed olefin by the crystalline zeolite.

ISOMERIZATION

The catalytic activity of zeolite Y, having less than 90 percent of the aluminum atoms associated with cations, for the isomerization of paraffinic hydrocarbons is demonstrated by the unexpectedly high yield of isohexanes in the hydrocracking process. When an active metal, such as one of the platinum group of Group VIII, is present, finely dispersed in the pore systems of the catalyst, it is a preferred catalyst for the isomerization process. The prefered isomerization process contemplated for the present invention is not only dependent on the catalyst hereinbefore described, but, is also dependent on such features as (1) reaction temperature (2) space velocity, (3) hydrogen-to-hydrocarbon ratio and, (4) reaction pressure.

With respect to temperature, the isomerization process should be carrier out at a range of between 250° C. and 425° C. It is preferred, however, when isomerizing a pentane fraction, to carry out the reaction at a temperature of between 350° C. and 375° C. It is also preferred, however when isomerizing a hexane fraction to carry out the reaction at a temperature of between 320° and 360° C. As a consequence of the closeness of the optimum isomerizing temperatures for pentane and hexane fractions, another surprising advance represented by the invention has also been found, i.e., it is now possible to isomerize mixtures of normal pentane and normal hexane fractions. In this regard, it has been discovered that the isomerization of a mixture of pentane and hexane can be effectively carried out employing the Pt or Pd catalysts at a temperature of between 330° to 355° C. In this range, the effective isomerization of both the pentane and hexane fractions will result. However, it is to be understood that the higher temperature limit of the just-mentioned temperature range will more effectively isomerize the pentane fraction, but would crack a higher proportion of the hexane to gas products. While, conversely, the lower temperature limit of the temperature range will isomerize the hexane efficiently but will result in the conversion of the pentane fraction being less. Moreover, with the addition of activators of Lewis acid type halides or other type hydrocarbons may be isomerized at temperatures substantially lower than 250° C.

It is to be clearly understood, therefore, that temperature is an exceedingly critical factor in the process of the invention. It is essential that the temperature of the isomerization not be carried out above 425° C. since undue cracking will occur. Indeed, even above 400° C. hydrocracking becomes significant and decreases the net yield of liquid product. However, butane can be effectively isomerized even at about 425° C.

A particularly good optimum temperature for isomerizing a pentane fraction has been found to be 350° C. A particularly effective isomerization temperature for hexane fraction has been found to be 330° C. A particularly effective temperature for the isomerization of a mixture of hexane and pentane fractions has been found to be 340° C. With palladium, even better activity can be achieved at a lower temperature. For example, a hexane fraction will be isomerized at a temperature of 320° C.

While isomerization of other paraffins besides normal pentane and normal hexane can be accomplished by the process of our invention, it is to be understood that isomerization of these last-named paraffins is of the utmost importance, because of their importance in gasoline upgrading.

With respect to the space velocity, the reaction should be carried out at a velocity of about 1 to 10 grams of feed per gram catalyst per hour. It is preferred, however, to carry the reaction out at a velocity of 2 to 5 grams feed per gram catalyst per hour. It has been found that as the space velocity is increased the yield of isoparaffins is decreased at a given temperature. It should be noted, however, that when the space velocity is kept constant, an increase in temperature will result in the yield of isoparaffins increasing steadily to a maximum. However, as aforementioned, after passing above the optimum temperatures set forth above, hydrocracking of the feed will increase. In this regard, the selectivity of the isomerization reaction is very high up to the optimum temperature. Above this temperature, however, the selectivity decreases.

The hydrogen-to-hydrocarbon ratio should extend from 0.3:1 to 10:1. It is preferred, however, that the hydrogen-to-hydrocarbon ratio extend from 2:1 to 5:1.

The pressure at which the isomerization reaction of this invention is carried out should extend from about 100 to about 1000 p.s.i.g. It is preferred, however, that the pressure of the reaction range from about 350 to about 600 p.s.i.g. At constant contact time the reaction appears to be favored by lower pressures. At low reaction temperatures the selectivity of the catalyst does not appear to be affected by the total reaction pressure. However, if the reaction temperature is increased above the optimum some hydrocracking will result. In this case higher operating pressures have been found to reduce the amount of this hydrocracking.

As indicated, heretofore, the invention has several advantageous features over those processes found in the prior art. Foremost among the advantages is the quality of the product itself. In this regard, the amount of isomers produced by the process has been found to closely approach the equilibrium in all normal paraffin to isomeric-paraffin relationships. The amount of 2,2-dimethylbutane contained in the hexane isomerizate formed by the process has been found to be more than 13 mol percent. This represents a decided advance in the art since heretofore the highest amount of 2,2-dimethylbutane achieved using other noble-metal type catalysts was about 10.5 mol percent. This isomer, i.e., 2,2-dimethylbutane, is among the most important of all the isomers formed in the reforming of straight-run gasoline fractions. Hence, a 13 and greater percent yield of this isomer represents a real contribution to the art.

Another advantageous feature resulting from the process is the fact that the corrosive activators formerly employed in all the known prior art processes need not now be employed.

A third advantageous feature of our process is that as a result of the fact that corrosive activators are not required, the feed of hydrocarbons need not be specially dried prior to contacting the same with the novel catalyst of our invention.

A still further advantage, is that the optimum isomerization temperatures are generally lower than those temperatures found in the prior art. In addition, the optimal isomerization temperature for the pentane and hexane fraction is very close, i.e., only 10 to 15° C. apart. As aforementioned, this factor enables a mixture of the pentane and hexane fraction to be isomerized simultaneously.

As aforementioned, it has been found that (1) the decationization, (2) the crystallinity, (3) the silica-alumina ratio and, (4) the pore size, influence the activity of metal-loaded zeolitic catalysts. To establish the importance of these effects, different type zeolites were loaded with 0.5 weight percent platinum and after subsequent activation were tested for their isomerization activity using n-hexane as feed with 100 cu. cm. volume of catalyst in a high pressure testing unit.

Among the zeolites prepared and tested were an amorphous zeolite of high silica-alumina molar ratio and certain crystalline zeolites. One of the crystalline zeolites had a small pore size and the other, the metal-loaded zeolite of the invention, had a large pore size and a high $SiO_2/Al_2O_3$ molar ratio. All the zeolites selected were prepared in their decationized forms. The characterization of the metal-loaded zeolitic catalysts used and the data for the activity are collected in the following table. The yield of the isohexane and the amount of 2,2-dimethylbutane present in the product indicates the isomerization activity. The amount of dimethylbutane in the product indicates high activity of the catalyst because the production of this compound is much more difficult than the production of the monomethyl pentanes.

of decationization can affect the catalytic activity to a significant extent. In view of the fact that the high Si/Al ratio improves catalytic activity, the lower catalytic activity of the amorphous alumino-silicate is believed attributable to the lack of crystallinity. Since the decationized zeolite Y was the only material that retained its crystal structure after moderate decationization, its high catalytic activity is attributed, at least in part, to the retention of the crystalline structure.

With respect to the operating conditions of our process, it is to be understood that not all the possible combinations of conditions selected from within these optimum conditions will yield the same results. Certain combinations are preferred. For example, the isomerization of a pentane fraction at a temperature of between 350° C. to 360° C. and at a space velocity of 2.0 grams normal pentane per gram catalyst per hour in a hydrogen-to-hydrocarbon mol ratio of 3.5, resulted in a 60 mol percent iso-pentane product, with a liquid yield of 99.5 volume percent. Similarly, the isomerization of a hexane feed of 96.8 mol percent purity at 340° C. using our process, resulted in a product containing 70.5 mol percent iso-hexane with a liquid yield of 99 volume percent.

*Isomerization of n-hexane with 0.5 wt.-percent Pt-loaded, decationized aluminosilicates [1]*

| Type of aluminosilicate | Cation content, percent | Si/Al atomic ratio | Pore size A. | Reaction temp., ° C. | Liquid yield, mol percent | Yield iso-hexane in $C_6$ fraction, mol percent | Yield 2,2-dimethylbutane in $C_6$ fraction, mol percent |
|---|---|---|---|---|---|---|---|
| Amorphous | 100 Na+ | 2.6 | (2) | 450 | >98 | 5 | <1 |
|  | 5 Na+, 95 decationized | 2.6 | (2) | 400 | 96 | 65 | 6 |
| Zeolite T [3] | 100 Na+, K+ | 3.3 | 4.8 | 425 | 96 | 73 | 11 |
|  | 19 Na+, 81 decationized | 3.3 | 4.8 | 400 | 91 | 8 | <1 |
|  |  |  |  | 375 | 67 | 47 | <1 |
| Zeolite X [4] | 100 Na+ | 1.2 | ~9–10 | 450 | >98 | 2 | 0 |
|  | 24 Na+, 76 decationized | 1.2 | (2) | 400 | 100 | 12 | <1 |
|  |  |  |  | 475 |  |  | 9.0 |
| Zeolite Y | 100 Na+ | 2.5 | ~9–10 | 475 | >98 | 5 | 0 |
|  | 15 Na+, 85 decationized | 2.5 | ~8–9 | 350 | >98 | 76 | 14 |

[1] Unless otherwise indicated, reaction conditions were:
Space velocity—2.0 g. feed/g. catalyst/hr.
Pressure—450 p.s.i.g.
$H_2$/N.C. mol ratio—3:1.
[2] No uniform pore size.
[3] Described in U.S. Patent No. 2,950,952 issued Aug. 30, 1960 to D. W. Breck et al.
[4] Described in U.S. Patent No. 2,882,244 issued April 14, 1959 to R. M. Milton.

These tests revealed that platinum loaded alkali metal cationic zeolites do not have appreciable activity as isomerization catalysts. The alkali metal cationic zeolite T contained potassium and sodium cations and had a pore size of about 4.8 angstrom units. It adsorbs only the n-paraffin molecules but the larger iso-paraffins are not admitted. The relatively low yield indicates that a small percent of the adsorbed n-hexane may have been converted to iso-paraffins, but these are trapped and decomposed. The other alkali metal cationic zeolites containing sodium cations have no activity at all for isomerization. As can be seen from the table the decationized zeolite Y with platinum as the active metal has more activity for isomerization than the other zeolites.

The difference in the catalytic activity of zeolites X and Y is very substantial due in part to the difference in the $SiO_2/Al_2O_3$ ratios of the two materials. Zeolite X contains more $AlO_4$ tetrahedra and more cations in proportion and in closer spacial relationship as zeolite Y. The activity of the decationized amorphous alumino-silicate lies between that of the decationized zeolite X and Y. The primary difference between the decationized amorphous alumino-silicate and decationized zeolite Y was that the former, besides being amorphous, had a slightly higher Si/Al ratio. Decationization of the amorphous material was more complete than in the case of zeolite X or zeolite Y. It is shown later that the degree This last reaction employed a space velocity of 2.0 grams normal hexane per gram catalyst per hour in a hydrogen-to-hydrocarbon ratio of 3.5. The amount of 2,2-dimethylbutane obtained in this last reaction was 13 mol percent in the total product and 14 mol percent in the hexane fraction. This product corresponded to an F-1 leaded Research octane number of 90.2. The term "F-1 leaded" is the Research octane number, with 3 cc. per liter tetraethyl lead.

Similarly, a preferred process for isomerizing a combined pentane-hexane feed composed of a 50/50 mixture of normal hexane and normal pentane comprised contacting the mixture with the catalyst of this invention at a temperature of 350° C. using a space velocity of 2.0 grams feed per gram catalyst per hour, and at a hydrogen-to-hydrocarbon mol ratio of 3.5. The liquid recovery obtained thereby was 99.5 volume percent. The liquid product contained 76.2 mol percent iso-hexane in the hexane fraction and 54.6 mol percent iso-pentane in the pentane fraction.

We have found, therefore, that a decationized molecular sieve zeolite having a metal of Group VIII of the Periodic Table finely-dispersed thereon in an amount of from 0.05 percent to 2.0 weight percent, having a monovalent cation to aluminum atom ratio of less than about 0.9, having a silica to alumina ratio in the zeolite greater than about 3 and having a pore size sufficient to release all paraffinic hydrocarbon isomers, is an excellent, superior catalyst under the reaction conditions previously set forth. In this regard, platinum and palladium are metals of Group VIII preferred in the practice of this invention, particularly in amounts of from 0.2 to 0.6 weight percent and more particularly where the monovalent cation to aluminum atom ratio is preferably less than about 0.6.

The feed of hydrocarbons may comprise straight-run gasoline fractions consisting essentially of pentanes and hexanes, separately or in a mixture. The latter will comprise normal pentane and normal hexane and may include other hydrocarbons. An example of such a mixture is a petroleum refinery light naphtha fraction. Moreover, our isomerization process will isomerize branched chain hydrocarbons to their further branched chain isomer, e.g., monomethyl pentane can be isomerized or converted to dimethylbutane.

Suitable charge stocks for our process, however, also include paraffinic fractions rich in normal pentane and normal hexane which are separated from the products of conversion processes. For example, a suitable charge is a light paraffinic fraction, rich in n-pentane and n-hexane which is obtained by distilling the reformate from a naphtha reforming process into a light and heavy fraction. Suitable paraffinic fractions can also be obtained from reforming products of other separation methods such as solvent extraction, preferential adsorption, etc.

The invention can be further illustrated by the examples which follow and by reference to the drawings of which:

Figure 1:
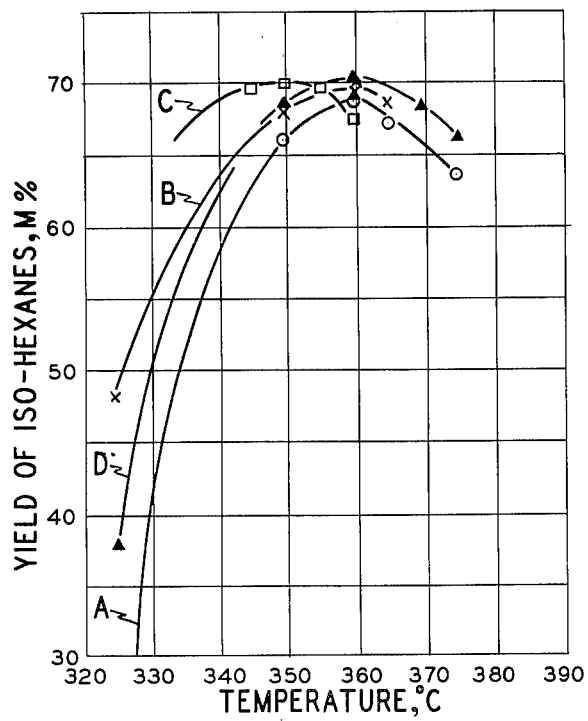
FIGURE 1 is a plot of the effect of activation of the catalyst on n-hexane isomerization.

A series of isomerization runs were carried out in a fixed bed catalytic reactor, employing a decationized platinum-loaded zeolite catalyst of this invention (prepared according to the process outlined in Example I above). The catalyst contained 0.5 percent platinum.

Table G appearing below illustrates the effect of the activation of the catalyst prior to the isomerization of a stream of normal hexane. Runs 1 through 5 appearing below show the effect of a fairly fast activation heating rate, i.e., at a rate approximately twice that outlined in Table I appearing heretofore. Runs 6 through 9 and Runs 14 through 17 illustrate the result of the activation of the catalyst at approximately the rate indicated in Table I. Runs 10 to 13 show the effect of a very slow activation of the catalyst prior to its employment, i.e., at a rate roughly one fourth of that shown in the program illustrated in Table I.

TABLE G

| Run No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Reaction temp., °C | 325 | 350 | 360 | 365 | 375 | 325 | 350 | 360 | 365 | 345 | 350 | 355 | 360 | 325 | 350 | 360 | 370 |
| Pressure, p.s.i.g | 450 | 450 | 450 | 450 | 450 | 450 | 450 | 450 | 450 | 450 | 450 | 450 | 450 | 450 | 450 | 450 | 450 |
| WHSV, g./g./hr | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| $H_2$/hydrocarbon, M:M | 5:1 | 5:1 | 5:1 | 5:1 | 5:1 | 5:1 | 5:1 | 5:1 | 5:1 | 5:1 | 5:1 | 5:1 | 5:1 | 5:1 | 5:1 | 5:1 | 5:1 |
| Time on stream, hours | 5 | 25 | 73 | 99 | 29 | 3 | 24 | 47 | 52 | 28 | 56 | 36 | 32 | 6 | 24 | 119 | 53 |
| Liquid yield, volume percent | 99.0 | 99.4 | 99.1 | 99.4 | 97.5 | 99.0 | 99.4 | 99.0 | 99.4 | 98.3 | 98.3 | 99.0 | 100 | 99.5 | 99.0 | 98.2 | 99.0 | 99.3 |
| Liquid analysis, mol percent: | | | | | | | | | | | | | | | | | |
| $C_1$–$C_3$ | 0.0 | 1.7 | 3.1 | 5.7 | 7.1 | 0.1 | 1.2 | 2.8 | 3.6 | 2.2 | 2.7 | 3.7 | 2.8 | 0.9 | 1.1 | 2.4 | 5.0 |
| $C_4$–$C_5$ | 0.3 | 1.5 | 2.5 | 3.8 | 5.7 | 0.0 | 1.1 | 2.3 | 2.6 | 2.3 | 2.6 | 3.4 | 2.1 | 1.2 | 1.5 | 2.2 | 3.7 |
| Methylcyclopentane | 2.8 | 2.0 | 1.8 | 1.5 | 1.2 | 2.4 | 2.1 | 1.9 | 1.7 | 2.0 | 2.0 | 1.8 | 2.1 | 2.3 | 1.7 | 1.6 | 1.5 |
| n-Hexane | 74.2 | 28.5 | 23.3 | 21.4 | 20.6 | 48.7 | 27.1 | 23.1 | 22.4 | 22.5 | 22.4 | 21.4 | 20.7 | 57.6 | 25.8 | 23.2 | 21.0 |
| 3-methylpentane | 8.2 | 19.7 | 19.6 | 18.7 | 18.1 | 16.5 | 19.9 | 19.5 | 19.2 | 19.2 | 19.2 | 18.8 | 18.6 | 8.6 | 19.5 | 19.4 | 18.6 |
| 2-methylpentane | }14.2 | 38.9 | 39.1 | 37.8 | 36.1 | 28.4 | 38.8 | 38.9 | 38.5 | 38.7 | 38.2 | 37.9 | 37.3 | 26.2 | 38.6 | 38.5 | 37.4 |
| 2,3-dimethylbutane | | | | | | | | | | | | | | | | | |
| 2,2-dimethylbutane | 0.2 | 7.7 | 10.6 | 11.1 | 11.0 | 3.9 | 9.8 | 11.7 | 12.0 | 12.9 | 12.9 | 13.0 | 12.9 | 3.2 | 11.7 | 12.7 | 12.8 |
| Yield (M percent i-$C_6$×V percent liquid product) | 22.5 | 65.9 | 68.7 | 67.2 | 63.6 | 48.2 | 68.1 | 69.4 | 68.5 | 69.6 | 69.9 | 69.7 | 68.5 | 37.6 | 68.5 | 70.6 | 68.3 |

Figure 3:
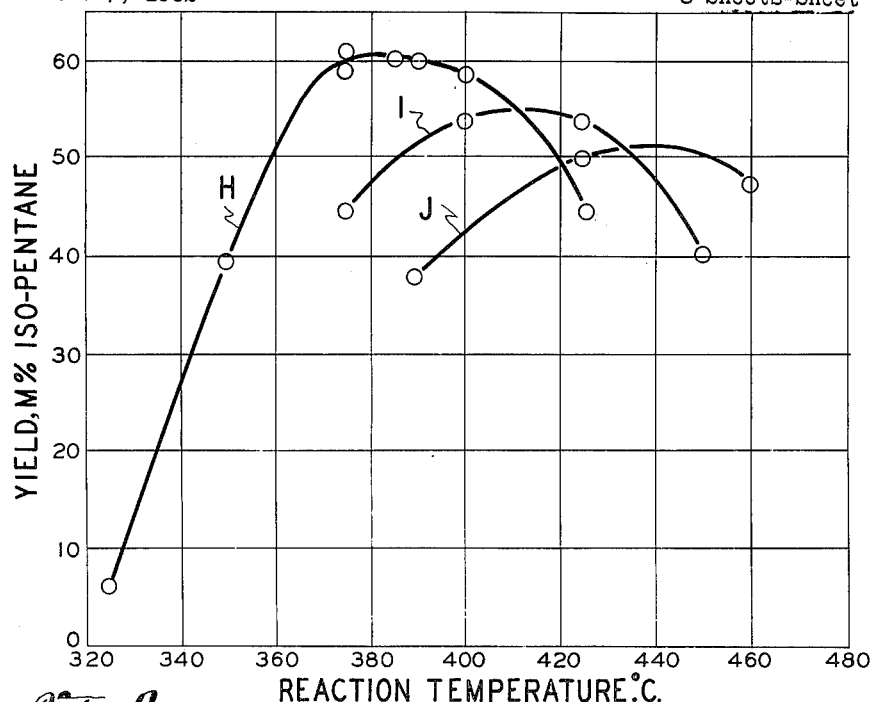

FIGURE 3 is a plot of the effects of space velocity on normal pentane isomerization.

Figure 4:
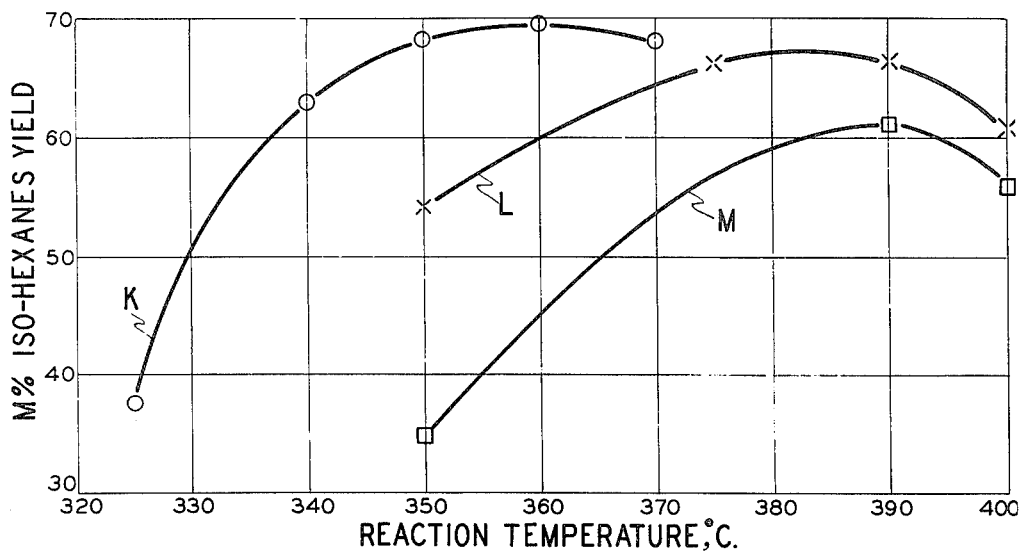

FIGURE 4 is a plot of the effect of space velocity on n-hexane isomerization.

Figure 5:
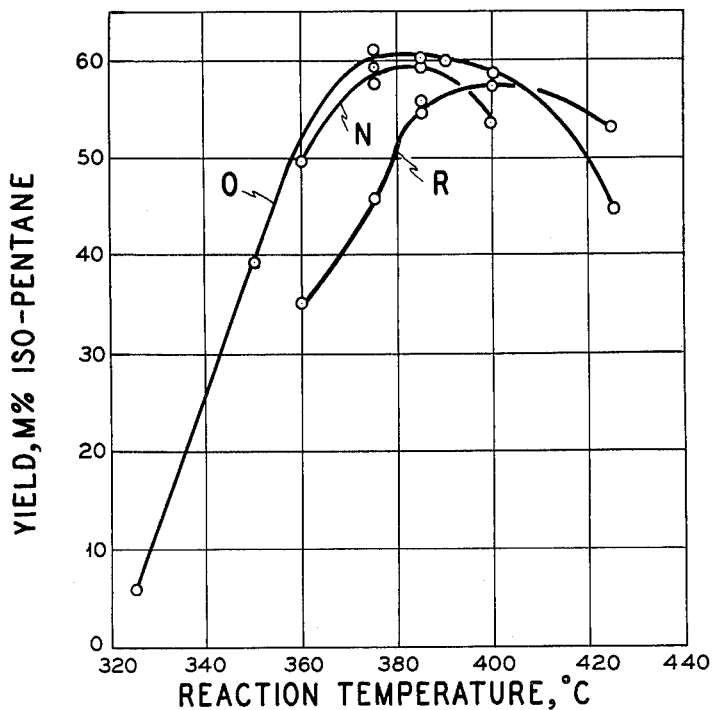

FIGURE 5 is a plot of the effect of hydrogen-to-hydrocarbon ratio on n-pentane isomerization.

Figure 6:
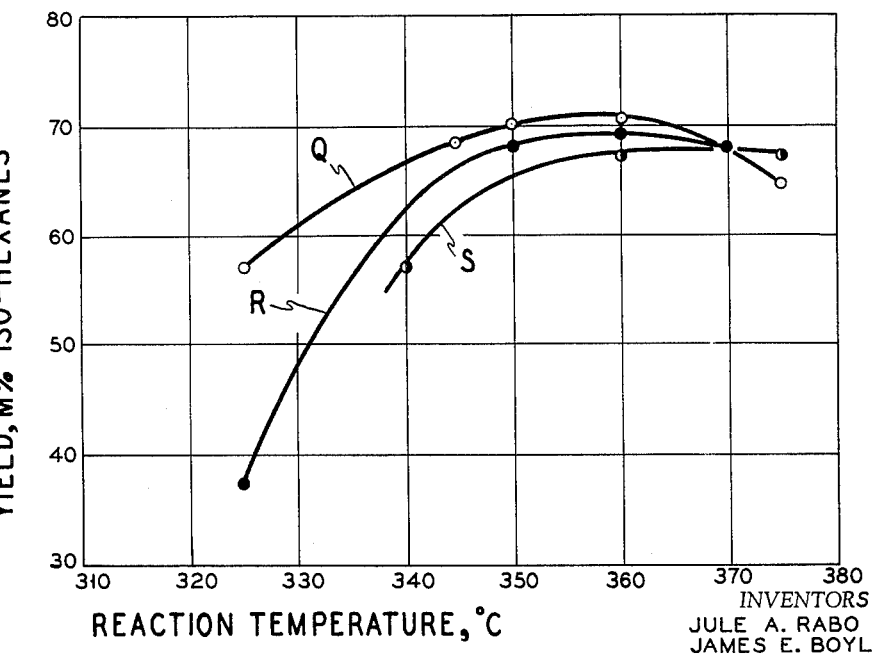

FIGURE 6 represents a plot of the effect of hydrogen-to-hydrocarbon ratios on n-hexane isomerization.

Figure 7:
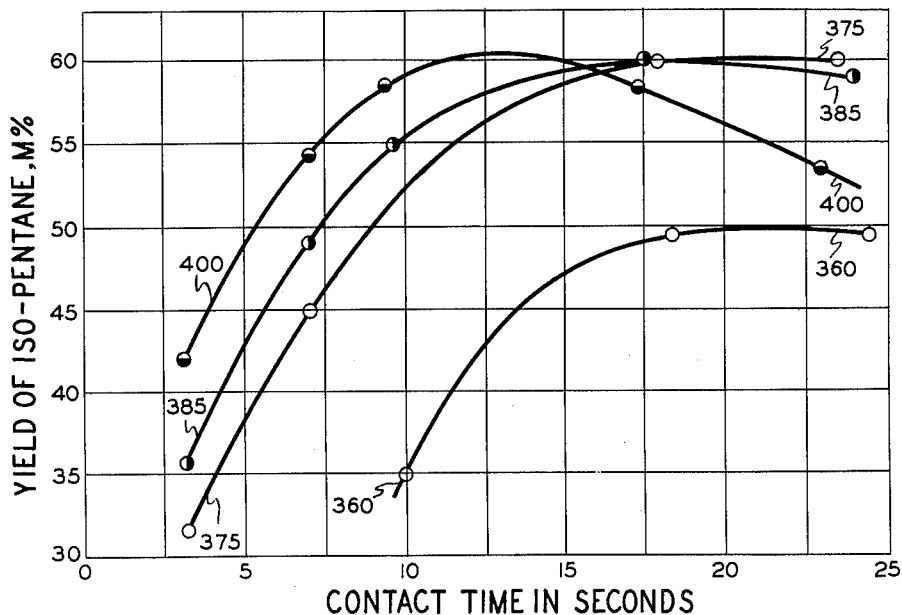

FIGURE 7 represents a plot of the effect of contact time on n-pentane isomerization.

Figure 8:
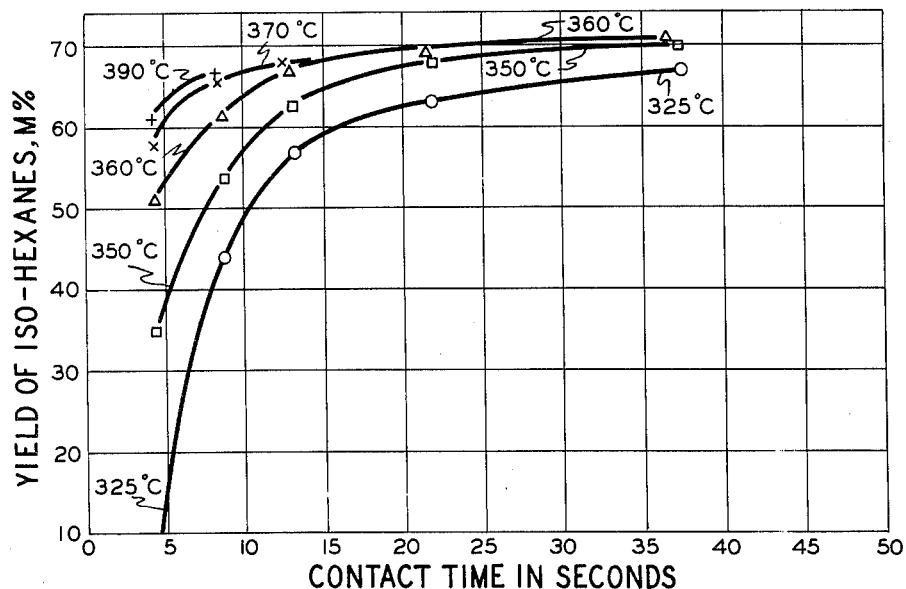

FIGURE 8 represents a plot of the effect of contact time on n-hexane isomerization.

Figure 9:
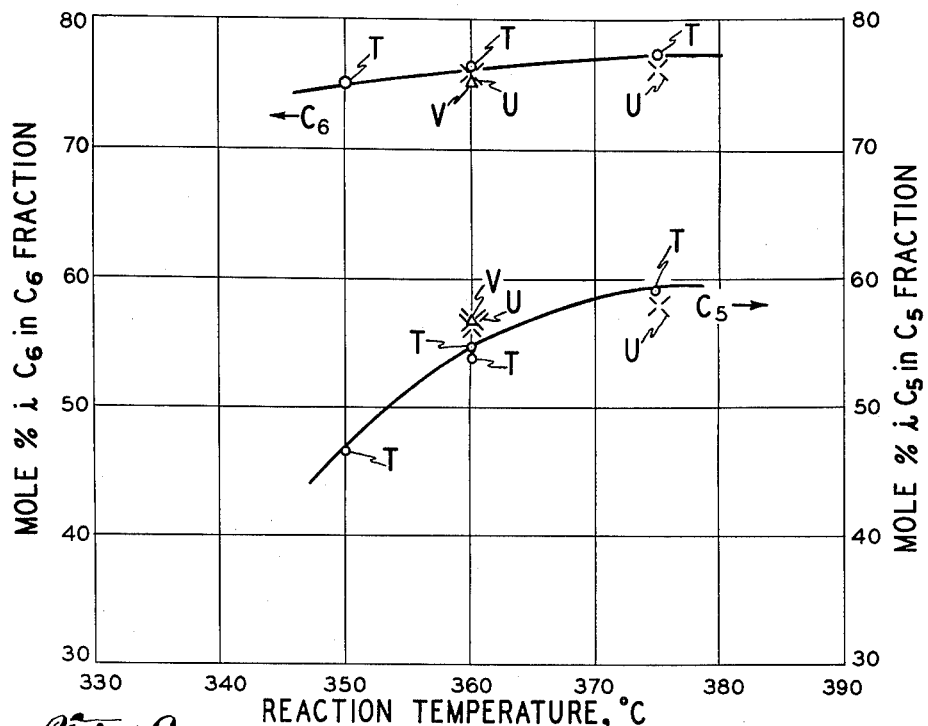

FIGURE 9 represents a plot of the effect on n-pentane n-hexane mixtures which are subjected to the catalyst of this invention.

Figure 10:
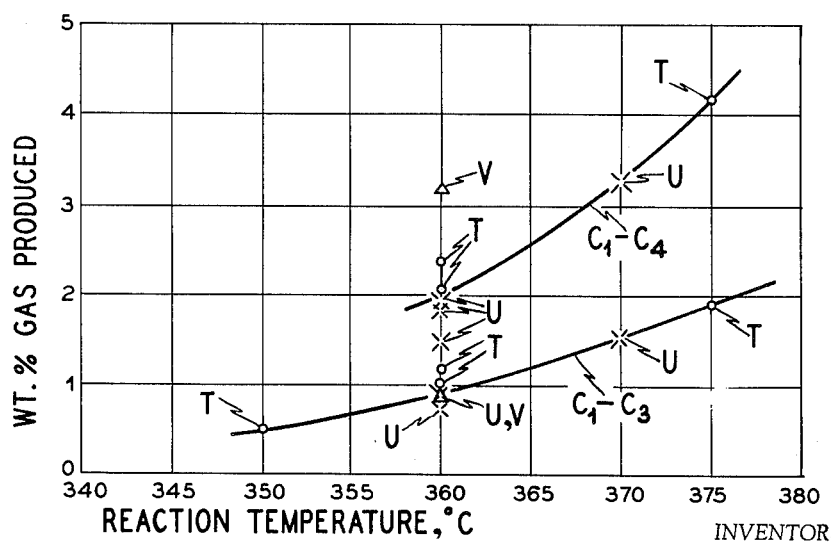
Figure 11:
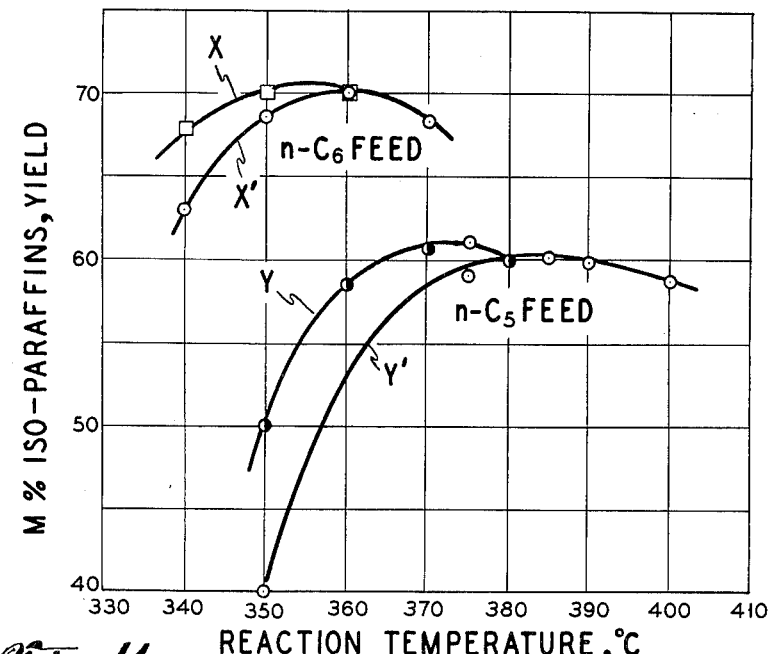
FIGURE 11 represents a plot of the effect on isomer yield of the inclusion of 20 p.p.m. propylene dichloride in the feed.
Figure 12:
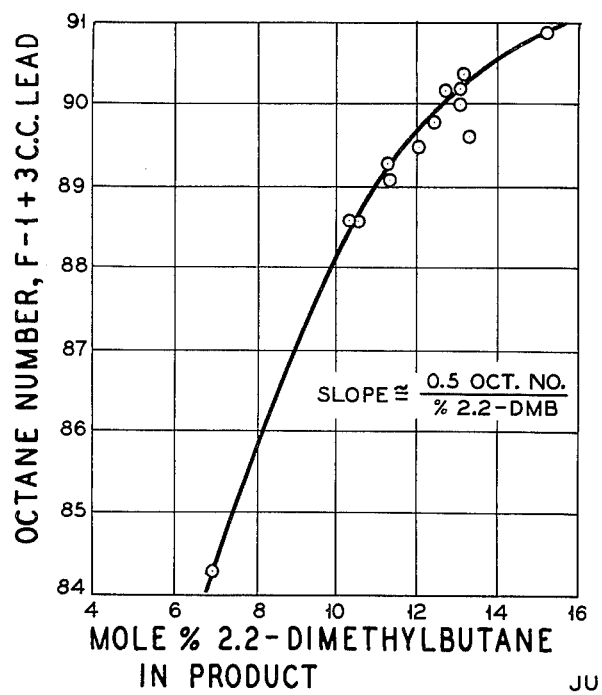
FIGURE 12 represents a plot of the relationship of the percent of 2,2-dimethylbutane to the F-1 leaded octane number of liquid product.
Figure 13:
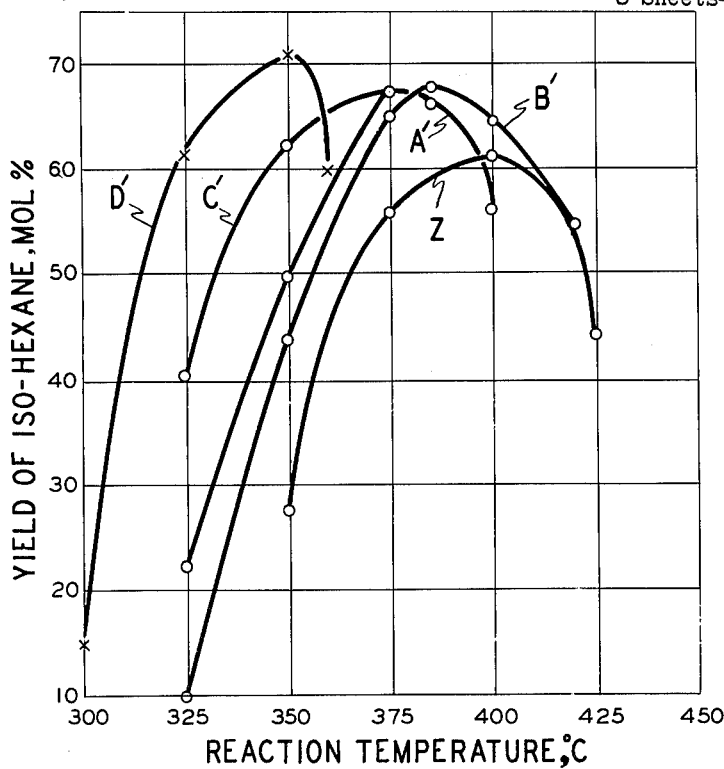
FIGURE 13 is a plot of the effects of the change in weight percent of the noble metal on n-hexane isomerization.
Figure 14:
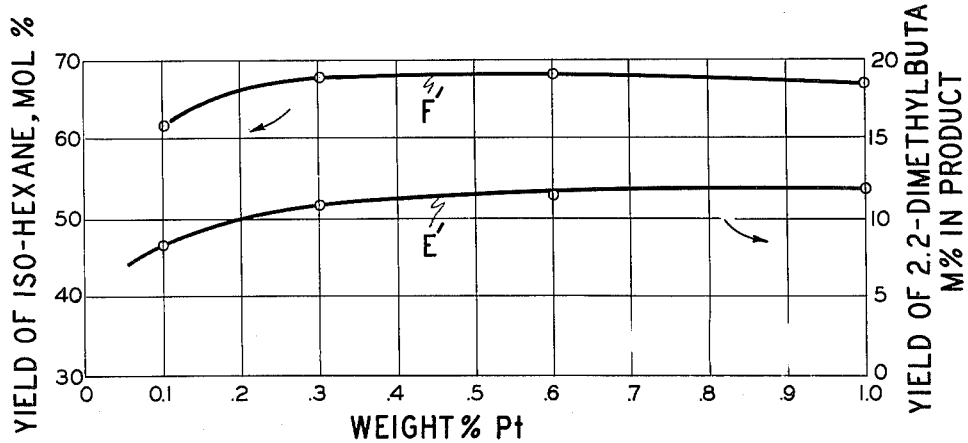
FIGURE 14 is a plot of the maximum yields of isomerization employing different weight percent noble metal.
Figure 15:
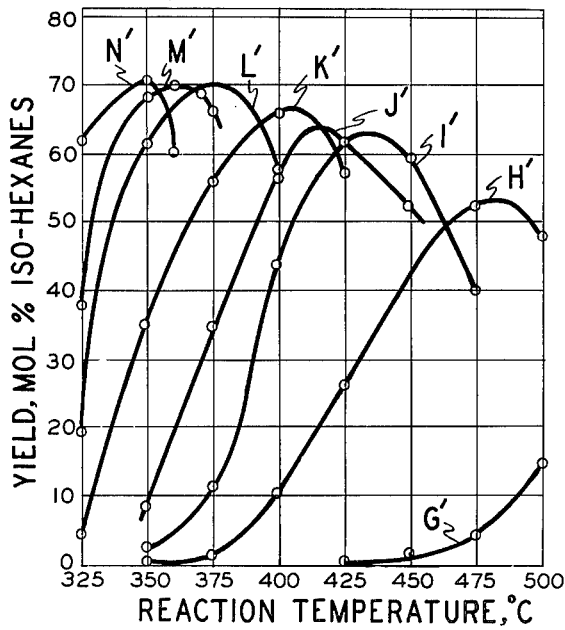
FIGURE 15 represents a plot of the effect on n-hexane isomerization of changing the degrees of decationization of the catalysts.
Figure 16:
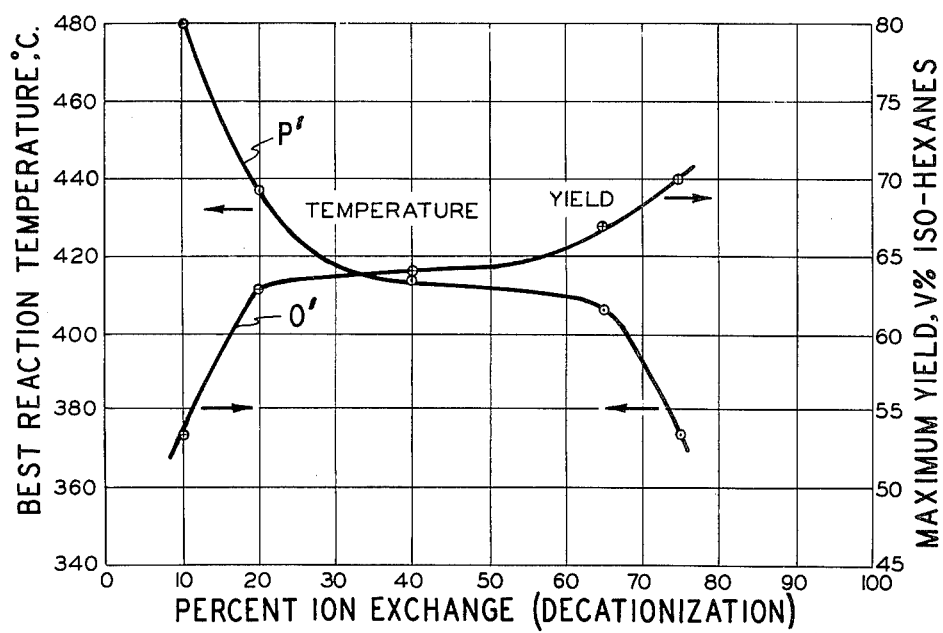
FIGURE 16 is a plot of the best temperature and yield relationship employing different degrees of decationized catalysts.

FIGURE 10 represents a plot of the gas yields for mixtures of n-pentane and n-hexane when subjected to isomerization.

The results of Table G are plotted in FIGURE 1. Runs 1 through 5 are indicated as curve A in said figure, Runs 6 through 9 are indicated as curve B, Runs 10 through 13 are indicated as curve C, and Runs 14 through 17 are indicated as curve D. As can be seen from FIGURE 1 and as aforementioned, a slow rate of activation of the catalyst is to be preferred, the total isoparaffin product yield being greatest in curves C and D when the peak change is reached at a lower reaction temperature.

EXAMPLE V

A series of n-hexane isomerization runs were carried out in a fixed bed catalytic reactor using a platinum loaded decationized zeolite Y catalyst of this invention. These runs illustrate that a variance of pressure in the range of 350 to 600 p.s.i.g. has little effect upon the percent yield. These results are tabulated in Table H appearing below.

TABLE H

Figure 2:
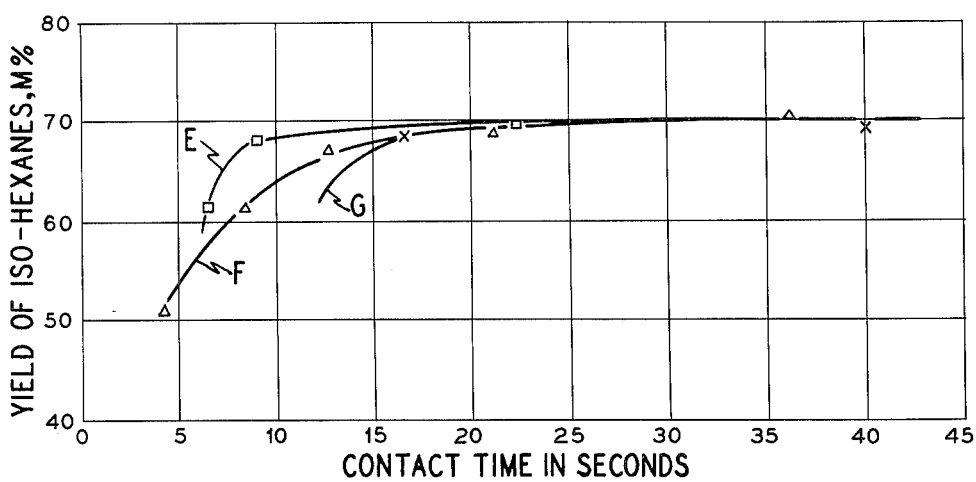
FIGURE 2 is a plot of the effect of contact time in n-hexane isomerization at various reaction pressures.

| Run No | 1 | 2 | 3 | 4 | 5 | 6 | 7 |
|---|---|---|---|---|---|---|---|
| Reaction temp., °C | 360 | 360 | 360 | 360 | 360 | 360 | 360 |
| Pressure, p.s.i.g | 600 | 600 | 600 | 350 | 350 | 350 | 450 |
| WHSV, g./g./hr | 5 | 2 | 2 | 5 | 2 | 2 | 2 |
| $H_2$/hydrocarbon, M:M | 5:1 | 10:1 | 3.5:1 | 5:1 | 3.5:1 | 10:1 | 3.5:1 |
| Time on stream, hours | 934 | 939 | 940 | 988 | 1,023 | 1,024 | 193 |
| Liquid yield, volume percent | 99.2 | 100.0 | 99.0 | 99.6 | 100.0 | 100.0 | 99 |
| Liquid analysis, mol percent: | | | | | | | |
| $C_1$-$C_3$ | 1.0 | 1.4 | 2.8 | 0.7 | 3.4 | 1.6 | 2.3 |
| $C_4$-$C_5$ | 1.1 | 1.4 | 3.0 | 1.1 | 3.9 | 1.8 | 2.6 |
| Methylcyclopentane | 2.6 | 2.3 | 1.9 | 2.8 | 1.8 | 2.3 | 1.6 |
| n-Hexane | 33.9 | 26.2 | 21.9 | 33.7 | 21.2 | 26.0 | 22.2 |
| 3-methylpentane | 20.0 | 19.5 | 19.1 | 18.6 | 18.7 | 19.2 | 19.3 |
| 2-methylpentane | 34.0 | 38.0 | 38.3 | 35.1 | 38.0 | 38.1 | 38.9 |
| 2,3-dimethylbutane | | | | | | | |
| 2,2-dimethylbutane | 7.6 | 11.1 | 13.0 | 8.1 | 13.1 | 11.1 | 13.0 |
| Yield (M percent i-$C_6$×V percent liquid product) | 61.1 | 68.6 | 69.7 | 61.6 | 69.8 | 68.4 | 70.5 | however, that if the reaction temperature is increased above the optimum operating temperature heretofore disclosed, hydrocracking will result. However, higher operating pressures will reduce this amount of hydrocracking. In FIGURE 2 the results of employing 350 p.s.i.g. are plotted on the graph as curve E. In FIGURE 2 the results of employing 450 p.s.i.g. are plotted on the graph as curve F. In FIGURE 2 the results of employing 600 p.s.i.g. are plotted on the graph curve G.

EXAMPLE VI

A series of isomerization runs were carried out in a fixed bed catalytic reactor in which a stream of n-pentane and a stream of n-hexane were contacted with a platinum loaded decationized zeolite catalyst of this invention. These runs were carried out to indicate the effect of space velocity on the isomerization of n-pentane and n-hexane. The results of these runs are indicated in Tables I and J appearing below.

TABLE I

*Effect of space velocity on the isomerization of n-pentane*

| Run No | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Reaction temp., °C | 325 | 350 | 375 | 375 | 385 | 390 | 400 | 425 | 375 | 400 | 425 | 450 | 390 | 425 | 460 |
| Pressure, p.s.i.g | 450 | 450 | 450 | 450 | 450 | 450 | 450 | 450 | 450 | 450 | 450 | 450 | 450 | 450 | 450 |
| WHSV, g./g./hr | 2.0 | 2.0 | 2.0 | 2.0 | 2.0 | 2.0 | 2.0 | 2.0 | 5.0 | 5.0 | 5.0 | 5.0 | 10.0 | 10.0 | 10.0 |
| $H_2$/hydrocarbon, M:M | 5:1 | 5:1 | 5:1 | 5:1 | 5:1 | 5:1 | 5:1 | 5:1 | 5:1 | 5:1 | 5:1 | 5:1 | 5:1 | 5:1 | 5:1 |
| Time on stream, hours | 5 | 28 | 46 | 65 | 157 | 182 | 69 | 89 | 135 | 140 | 159 | 161 | 183 | 184 | 185 |
| Liquid yield, volume percent | 99.0 | 99.0 | 99.0 | 99.4 | 99.0 | 99.0 | 99.3 | 88.6 | 99.2 | 99.1 | 98.3 | 83.7 | 99.2 | 98.7 | 94.1 |
| Liquid analysis, mol percent: | | | | | | | | | | | | | | | |
| $C_1$-$C_3$ | 0.0 | 0.0 | 0.3 | 0.3 | 0.6 | 0.9 | 1.5 | 3.2 | 0.1 | 0.4 | 2.0 | 3.6 | 0.1 | 1.0 | 2.9 |
| iso-$C_4$ | 0.0 | 0.0 | 0.8 | 0.9 | 1.7 | 2.3 | 3.9 | 9.9 | 0.4 | 1.1 | 4.4 | 10.3 | 0.4 | 2.3 | 6.3 |
| n-$C_4$ | 0.0 | 0.0 | 0.0 | 0.0 | 1.0 | 1.2 | 1.3 | 3.4 | 0.0 | 0.9 | 2.0 | 3.3 | 0.0 | 1.5 | 2.2 |
| n-Pentane | 93.6 | 59.9 | 39.2 | 37.2 | 36.0 | 35.3 | 34.0 | 33.7 | 54.4 | 43.0 | 36.7 | 34.8 | 61.0 | 44.4 | 38.2 |
| i-Pentane | 6.4 | 40.1 | 59.8 | 61.4 | 60.7 | 60.4 | 59.2 | 49.8 | 45.2 | 54.5 | 54.9 | 48.0 | 38.4 | 50.7 | 50.4 |
| Yield (M percent i-$C_5$×V percent liquid product) | 6.3 | 39.7 | 59.2 | 61.0 | 60.0 | 59.8 | 58.8 | 44.1 | 44.8 | 54.0 | 54.0 | 40.2 | 38.1 | 50.0 | 47.4 |

TABLE J

*Effect of space velocity on the isomerization of n-hexane*

| Run No | 1 | 2 | 3 | 4 | 5 | 6 | 7 | 8 | 9 | 10 |
|---|---|---|---|---|---|---|---|---|---|---|
| Reaction temp., °C | 325 | 350 | 360 | 370 | 350 | 375 | 390 | 400 | 350 | 390 |
| Pressure, p.s.i.g | 450 | 450 | 450 | 450 | 450 | 450 | 450 | 450 | 450 | 450 |
| WHSV, g./g./hr | 2.0 | 2.0 | 2.0 | 2.0 | 5.0 | 5.0 | 5.0 | 5.0 | 10.0 | 10.0 |
| $H_2$/hydrocarbon, M:M | 5:0 | 5:0 | 5:0 | 5:0 | 5:0 | 5:0 | 5:0 | 5:0 | 5:0 | 5:0 |
| Time on stream, hours | 6 | 24 | 47 | 53 | 101 | 78 | 99 | 97 | 126 | 121 |
| Liquid yield, volume percent | 99.0 | 98.2 | 98.0 | 99.3 | 99.6 | 99.5 | 100.0 | 95.9 | 98.8 | 98.5 |
| Liquid analysis, mol percent: | | | | | | | | | | |
| $C_1$-$C_3$ | 0.9 | 1.1 | 2.3 | 5.0 | 0.4 | 2.6 | 4.6 | 8.2 | 0.2 | 2.4 |
| $C_4$-$C_5$ | 1.2 | 1.5 | 2.2 | 3.7 | 0.0 | 2.1 | 3.3 | 5.6 | 0.0 | 1.9 |
| Methylcyclopentane | 2.3 | 1.7 | 1.7 | 1.5 | 2.2 | 1.9 | 1.6 | 1.2 | 2.5 | 2.0 |
| n-Hexane | 57.6 | 25.8 | 22.5 | 21.0 | 42.9 | 26.9 | 23.7 | 21.2 | 62.3 | 32.5 |
| 3-Methylpentane | 8.6 | 19.5 | 19.4 | 18.6 | 17.5 | 19.0 | 18.7 | 17.9 | 12.6 | 18.4 |
| 2-Methylpentane | 26.2 | 38.6 | 38.9 | 37.4 | 31.3 | 37.1 | 36.9 | 35.3 | 20.3 | 33.9 |
| 2,3-Dimethylbutane | | | | | | | | | | |
| 2,2-Dimethylbutane | 3.2 | 11.7 | 13.0 | 12.8 | 5.6 | 10.4 | 11.1 | 10.7 | 2.1 | 9.0 |
| Yield (M percent i-$C_6$×V percent liquid product) | 37.6 | 68.5 | 69.9 | 68.3 | 54.4 | 66.2 | 66.7 | 61.3 | 34.6 | 61.3 |

FIGURE 2 shows the effect of contact time on the isomerization of hexane using catalyst prepared as in Example I. The results are given in terms of contact time on the n-hexane feed at 360° C. versus the total yield of isohexanes. At short contact times, the reaction is favored by lower pressures. At lower reaction temperatures, the selectivity of the catalyst does not appear to be affected by the reaction pressure. It has been found, The results of Tables I and J are plotted in FIGURES 3 and 4. In the above figures and tables the effect of changing the space velocity, i.e., WHSV, from 2.0 to 10.0 with other conditions constant is indicated. Curve H in FIGURE 3 represents a WHSV of 2.0, curve I in FIGURE 3 represents a WHSV of 5.0, and curve J in FIGURE 3 represents a WHSV of 10.0. Curve K in FIGURE 4 represents a WHSV of 2.0, curve L in FIGURE 4 represents a WHSV of 5.0, and curve M in FIGURE 4 represents a WHSV of 10.0. At a given temperature, the yield of iso-paraffins decreases as the space velocity is increased. As the reaction temperature is increased, holding the space velocity constant, the yield of iso-paraffins increases to a maximum and then decreases due to the hydrocracking of the feed. It can be seen that the selectivity of the isomerization reaction is very high up to the optimum temperature. Above this temperature, however, the selectivity steadily decreases.

As indicated above, we prefer in our isomerization process to use a hydrogen concentration expressed in a hydrogen-to-hydrocarbon molar ratio of 1:1 to 10:1. In order to show that the yield of iso-paraffins will decrease as the hydrogen-to-hydrocarbon ratio is increased, we have performed another series of isomerization runs. The details are described in Example VII below.

EXAMPLE VII

A stream of n-pentane was contacted with a platinum loaded decationized zeolite Y catalyst of this invention under the reaction temperature and conditions set forth in Table K below. The hydrogen-to-hydrogen ratio was varied from 3.5:1 to 10:1. Another stream consisting of n-hexane was also contacted in like manner. The reaction conditions and the results of this latter contact are tabulated in Table L below.

The results of Tables K and L are plotted in FIGURES 5 and 6, respectively. As indicated therein, the yield of iso-paraffins decreases as the hydrogen-to-hydrocarbon ratio is increased above about 5.

Referring to FIGURE 5, curve N represents a 3.5 H/HC ratio, curve O represents a 5.0 H/HC ratio, and curve P represents a 10:1 H/HC ratio.

Referring to FIGURE 6, curve Q represents a 3.5 H/HC ratio, curve O represents a 5.0 H/HC ratio, and curve S represents a 10:1 H/HC ratio.

FIGURES 7 and 8 show the iso-paraffin yields at various contact times for several different reaction temperatures. The superficial contact times of the n-hexane and n-pentane runs are calculated from the hydrogen-to-hydrocarbon ratio and the space velocity. The curves indicated in FIGURES 7 and 8 show that the hydrogen-to-hydrocarbon ratio and the space velocity influence the isomerization reaction primarily insofar as they affect contact time. This indicates that the relative partial pressures of hydrogen and hydrocarbon, at fixed total pressures, have little effect on the reaction within the preferred reaction conditions.

EXAMPLE VIII

A series of isomerization runs were carried out in a fixed bed catalytic reactor, using as feeds, mixtures containing n-hexane and n-pentane by contacting said feeds with a platinum loaded decationized zeolite catalyst of this invention prepared in the manner as outlined in Ex-

TABLE K

*Effect of hydrogen-to-hydrocarbon ratio in n-pentane isomerization*

| Run No | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Reaction temp., °C | 325 | 350 | 375 | 375 | 385 | 390 | 400 | 425 | 360 | 375 | 385 | 400 | 360 | 375 | 385 | 385 | 400 | 425 |
| Pressure, p.s.i.g | 450 | 450 | 405 | 450 | 450 | 450 | 450 | 450 | 450 | 450 | 450 | 450 | 450 | 450 | 450 | 450 | 450 | 450 |
| WHSV, g./g./hr | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| $H_2$/Hydrocarbon, M:M | 5:1 | 5:1 | 5:1 | 5:1 | 5:1 | 5:1 | 5:1 | 5:1 | 3.5:1 | 3.5:1 | 3.5:1 | 3.5:1 | 10:1 | 10:1 | 10:1 | 10:1 | 10:1 | 10:1 |
| Time on stream, hours | 5 | 25 | 46 | 65 | 157 | 182 | 69 | 89 | 354 | 330 | 332 | 335 | 289 | 307 | 264 | 210 | 212 | 286 |
| Liquid yield, volume percent | 99.0 | 99.0 | 99.0 | 99.4 | 99.0 | 99.0 | 99.3 | 88.6 | 99.5 | 99.0 | 99.5 | 96.2 | 99.5 | 99.5 | 99.5 | 97.5 | 97.5 | 94.7 |
| Liquid analysis, mol percent: | | | | | | | | | | | | | | | | | | |
| $C_1$-$C_3$ | 0.0 | 0.0 | 0.3 | 0.3 | 0.6 | 0.9 | 1.5 | 3.2 | 0.1 | 0.3 | 1.2 | 2.2 | 0.1 | 0.1 | 0.2 | 0.2 | 0.6 | 1.6 |
| $C_4$ | 0.0 | 0.0 | 0.8 | 0.9 | 1.7 | 2.3 | 3.9 | 9.9 | 0.4 | 1.0 | 2.3 | 5.4 | 0.1 | 0.2 | 0.6 | 0.7 | 1.6 | 4.7 |
| n-Pentane | 93.6 | 60.6 | 39.2 | 37.2 | 36.0 | 35.3 | 34.0 | 33.7 | 49.8 | 40.1 | 35.6 | 34.2 | 64.7 | 53.7 | 43.1 | 42.7 | 37.7 | 36.0 |
| i-Pentane | 6.4 | 39.4 | 59.8 | 61.4 | 60.7 | 60.4 | 59.2 | 49.8 | 49.7 | 58.0 | 59.5 | 55.7 | 35.0 | 45.5 | 55.8 | 56.0 | 59.7 | 55.9 |
| >$C_5$ | 0.0 | 0.0 | 0.0 | 0.0 | 1.0 | 1.2 | 1.3 | 3.4 | 0.0 | 0.6 | 1.5 | 2.4 | 0.0 | 0.4 | 0.4 | 0.4 | 0.4 | 1.8 |
| Yield (M percent i-$C_5$ vol. percent liquid product) | 6.3 | 39.0 | 59.2 | 61.0 | 60.1 | 59.8 | 58.8 | 44.1 | 49.5 | 57.4 | 59.2 | 53.6 | 34.8 | 45.3 | 55.5 | 54.6 | 58.2 | 52.9 |

TABLE L

*Effect of hydrogen-to-hydrocarbon ratio in n-hexane isomerization*

| Run No | 1 | 2 | 3 | 4 | 5 | 6 | 7 | 8 | 9 | 10 | 11 | 12 |
|---|---|---|---|---|---|---|---|---|---|---|---|---|
| Equilibrium temp., °C | 325 | 345 | 350 | 360 | 375 | 325 | 350 | 360 | 370 | 340 | 360 | 375 |
| Pressure, p.s.i.g | 450 | 450 | 450 | 450 | 450 | 450 | 450 | 450 | 450 | 450 | 450 | 450 |
| WHSV, g./g./hr | 2.0 | 2.0 | 2.0 | 2.0 | 2.0 | 2.0 | 2.0 | 2.0 | 2.0 | 2.0 | 2.0 | 2.0 |
| $H_2$/hydrogen, M:M | 3.5:1 | 3.5:1 | 3.5:1 | 3.5:1 | 3.5:1 | 5:1 | 5:1 | 5:1 | 5:1 | 10:1 | 10:1 | 10:1 |
| Time on stream, hours | 245 | 220 | 171 | 193 | 510 | 197 | 6 | 24 | 47 | 53 | 150 | 146 | 148 |
| Liquid yield, volume percent | 99.0 | 99.4 | 99.0 | 99.0 | 98.9 | 99.0 | 98.2 | 98.0 | 99.3 | 98.3 | 99.0 | 97.2 |
| Liquid analysis, mol percent: | | | | | | | | | | | | |
| $C_1$-$C_3$ | 0.5 | 1.2 | 1.6 | 2.3 | 7.0 | 0.9 | 1.1 | 2.3 | 5.0 | 0.7 | 1.0 | 3.8 |
| $C_4$-$C_5$ | 0.7 | 1.3 | 2.1 | 2.6 | 6.3 | 1.2 | 1.5 | 2.2 | 3.7 | 0.8 | 1.3 | 2.9 |
| Methylcyclopentane | 2.1 | 2.1 | 2.2 | 1.6 | 1.3 | 2.3 | 1.7 | 1.7 | 1.5 | 2.3 | 2.1 | 1.5 |
| n-Hexane | 38.9 | 26.1 | 23.2 | 22.2 | 19.7 | 57.6 | 25.8 | 22.5 | 21.0 | 37.9 | 27.1 | 22.2 |
| 3-methylpentane | 18.1 | 19.5 | 19.2 | 19.3 | 17.7 | 8.6 | 19.5 | 19.4 | 18.6 | 19.0 | 19.6 | 19.2 |
| 2-methylpentane, 2,3-dimethylpentane | 33.4 | 38.5 | 39.0 | 38.9 | 35.6 | 26.2 | 38.6 | 38.9 | 37.4 | 32.3 | 38.1 | 37.9 |
| 2,2-dimethylbutane | 6.3 | 11.2 | 12.7 | 13.0 | 12.4 | 3.2 | 11.7 | 13.0 | 12.8 | 7.0 | 10.8 | 12.4 |
| Yield (M percent i-$C_6$ XV percent liquid product) | 57.2 | 68.8 | 70.2 | 70.5 | 65.0 | 37.6 | 68.5 | 69.9 | 68.3 | 57.3 | 67.8 | 67.6 |
| R.O.N.+3 cc. TEL/gal | | | | | | | | | | 84.3 | 88.6 | | ample I above. Results are tabulated in Table M appearing below.

TABLE M

*Isomerization of pentane-hexane mixtures*

| Run No | 1 | 2 | 3 | 4 | 5 | 6 | 7 |
|---|---|---|---|---|---|---|---|
| Feed | T | T | T | T | U | U | V |
| Reaction temp., °C | 350 | 360 | 360 | 375 | 370 | 360 | 360 |
| Pressure, p.s.i.g | 450 | 450 | 450 | 450 | 450 | 450 | 450 |
| WHSV, g./g./hr | 2.0 | 2.0 | 2.0 | 2.0 | 2.0 | 2.0 | 2.0 |
| $H_2$/hydrocarbon, M:M | 3.5:1 | 3.5:1 | 3.5:1 | 3.5:1 | 3.5:1 | 3.5:1 | 3.5:1 |
| Time on stream, hours | 471 | 447 | 468 | 450 | 702 | 697 | 746 |
| Liquid yield, volume percent | 99.5 | 99.5 | 99.5 | 97.2 | 99.5 | 98.9 | 99.4 |
| Liquid analysis, mol percent: | | | | | | | |
| $C_1$-$C_3$ | 1.3 | 3.3 | 2.9 | 5.2 | 4.2 | 2.6 | 2.7 |
| $C_4$ | 0.9 | 1.4 | 1.7 | 3.8 | 2.4 | 1.7 | 3.2 |
| Methylcyclopentane | 1.1 | 0.8 | 0.8 | 0.4 | 0.7 | 1.1 | 2.6 |
| n-Pentane | 27.4 | 22.9 | 23.1 | 21.0 | 21.7 | 23.2 | 23.8 |
| i-Pentane | 23.7 | 27.5 | 27.0 | 30.2 | 28.6 | 27.0 | 29.1 |
| n-Hexane | 11.4 | 10.4 | 10.6 | 9.0 | 10.0 | 10.5 | 9.3 |
| 3-Methylpentane | 9.6 | 9.0 | 9.3 | 8.1 | 8.8 | 9.2 | 8.4 |
| 2-Methylpentane 2,3-dimethylbutane | 19.1 | 18.3 | 18.7 | 16.6 | 17.7 | 18.4 | 15.9 |
| 2,2-dimethylbutane | 5.7 | 5.9 | 6.0 | 5.6 | 6.0 | 6.3 | 5.0 |
| Pentane Fraction, mol percent: | | | | | | | |
| n-Pentane | 53.6 | 45.4 | 46.2 | 41.0 | 42.0 | 45.1 | 44.2 |
| i-Pentane | 46.4 | 54.6 | 53.8 | 59.0 | 58.0 | 54.9 | 55.8 |
| Hexane fraction, mol percent: | | | | | | | |
| n-Hexane | 24.9 | 23.8 | 23.8 | 22.9 | 23.5 | 23.6 | 24.1 |
| 3-Methylpentane | 21.0 | 20.6 | 20.9 | 20.6 | 20.7 | 20.7 | 21.8 |
| 2-Methylpentane 2,3-dimethylbutane | 41.7 | 42.0 | 41.9 | 42.2 | 41.6 | 41.4 | 41.2 |
| 2,3-dimethylbutane | 12.4 | 13.5 | 13.5 | 14.2 | 14.1 | 14.2 | 13.0 |

The results of Table M are plotted in FIGURES 9 and 10. FIGURE 9 represents the effect of isomerization process of this invention on the combined pentane-hexane mixture. FIGURE 10 represents a plot of the gas yields resulting from contacting the mixture of pentane and hexane with a novel catalyst and under the novel conditions of this invention. The plots on each graph are represented by the letters T, U, and V which correspond to the columns indicated in Table M. It is to be again noted that FIGURE 9 indicates the percent yield of the iso-hexane in the hexane fraction and iso-pentane in the pentane fraction. FIGURE 10 represents the amount of gas produced as a result of the reaction.

The optimum temperatures for the isomerization of n-pentane and n-hexane are about 350° C. and 330° C. respectively. As aforementioned, the small difference in the optimum operating temperatures of the pentane and hexane fractions enables the catalyst to isomerize the combined feed efficiently at a temperature slightly above that required for the hexane fraction. Analysis of the product shows that, at 360° C., the hexanes are isomerized as efficiently as is the pure hexane feed at 355° C. The pentantes, on the other hand, are isomerized only slightly less efficiently than is the pure pentane feed at 370° C. FIGURE 9 and Table M indicate that the normalized iso-hexane content of the pentane and hexane fractions in the products is a function of reaction temperature. It should be noted that this graph does not show the extent of hydrocracking of the feed. FIGURE 10, also representing a plot of Table M, represents the amount of methane, ethane, propane, and butane hydrocarbon fractions expressed as weight percent in the liquid product. Since the over-all liquid product yields are usually about 99 percent, this figure essentially represents a total amount of hydrocracking of the feed. In Runs 1 through 4 plotted on FIGURES 9 and 10, the feed composition (T) was as follows:

Mol percent
n-Pentane _____ 55.1
n-Hexane _____ 44.9

Runs 1 through 4 are indicated on FIGURE 9 as T. Runs 5 and 6 of Table M, represented on FIGURE 9 as U, had the following composition:

Mol percent
n-Pentane _____ 51.9
h-Hexane _____ 46.5
Ethylcyclo-pentane _____ 1.6

Run 7 represented as V has the following feed composition:

Mol percent
Iso-pentane _____ 5.3
n-Pentane _____ 50.9
2-methylpentane _____ 2.4
3-methylpentane _____ 2.0
n-Hexane _____ 33.2
Methylcyclopentane _____ 3.5
2,4-dimethylpentane _____ 0.2
2,4-dimethylpentane _____ 0.2
Cyclohexane _____ 1.6
n-Heptane _____ 0.2
Methylcyclohexane _____ 0.3

REFORMING

The reforming activity of the metal loaded catalyst of the present invention is shown by the following performance data. Also shown is the increase of reforming activity as the degree of decationization is increased. In the reforming reaction shown, a light gasoline feed was used.

TABLE V

*Effect of degree of decationization on reforming activity of zeolite Y ($SiO_2$:$Al_2O_3$) =4.8 loaded with 0.5 wt. percent Pt by ion exchange*

| Percent decationization | 20 | | 40 | | 65 |
|---|---|---|---|---|---|
| Equilibrium temp., °C | 455 | 475 | 425 | 450 | 425 |
| Liquid yield, vol. percent | 83 |  | 88 | 74 | 65 |
| Liquid analysis, vol. percent: | | | | | |
| Saturates | 79 | 70 | 84 | 72 | 82 |
| Olefins | 1 | 1 | 1 | 1 | 1 |
| Aromatics | 20 | 29 | 15 | 27 | 17 |
| Research Octane No. Clear | 75.4 | 82.5 | 79.9 | 85.2 | 83.3 |

Constant process conditions:
  Pressure, 450 p.s.i.g.
  W.H.S.V., 2.0 g./g./hr.
  $H_2$:HC, molar ratio 5.

Feed Stock: Light naphtha, 350° C. end point.
Composition:
  Paraffins—95 vol. percent
  Olefins—0 vol. percent
  Aromatics—5 vol. percent The reforming process employing the decationized zeolite Y catalyst containing within the pore system from 0.01 to 2.0 wt. percent of an active metal such as the platinum group of Group VIII is preferably carried out within the following ranges of process conditions. The broad temperature range is 300° to 600° C. and more particularly 400 to 525° C. The pressure should be in the range of 100 to 1200 p.s.i.g. more particularly 300–600 p.s.i.g., and the hydrogen to hydrocarbon feed mole ratio should be from 1:1 to 20:1 and more particularly 2:1 to 5:1. The contact time expressed as weight hourly space velocity WHSV, should be 0.1 to about 7 and more particularly from 0.5 to 3.

DEALKYLATION

The preferred catalyst for dealkylation activity in the present invention is the metal loaded catalyst in a hydrogen atmosphere. The usual feeds to a catalytic dealkylation unit are alkyl-substituted aromatics such as toluene. The present hydro-dealkylation process is preferably carried out a temperature of 400–600° C., particularly 450–550, at a pressure of 50–1000 p.s.i.g., particularly 50–500 p.s.i.g. at a weight-hour space velocity of .5–5 particularly .5–2, and at a hydrogen to hydrocarbon molar ratio of 3–20, particularly 5–10.

The following table shows a comparison of the hydrodealkylation activity of different platinum loaded aluminosilicates.

TABLE VI

*Effect of degree of decationization on hydrodealkylation activity of zeolite Y ($SiO_2:Al_2O_3$ molar ratio=4.8) loaded with 0.5 wt. percent Pt by ion-exchange*

| Percent decationization | 10 | 20 | 40 | 65 | 75 |
|---|---|---|---|---|---|
| Equilibrium reaction temp., °C | 550 | 550 | 525 | 500 | 500 |
| Liquid yield, vol. percent | 92.6 | 91.7 | 72.6 | 78.5 | 78.7 |
| Liquid analysis, mol. percent: | | | | | |
| Benzene | 14.8 | 36.8 | 38.3 | 26.4 | 25.2 |
| Toluene | 73.2 | 51.8 | 43.0 | 43.9 | 37.3 |
| Xylenes | 12.0 | 9.3 | 11.7 | 16.1 | 9.7 |
| Cracked products | 0 | 2.0 | 7.0 | 13.7 | 27.7 |
| Yield of benzene, vol. percent of feed | 13.7 | 33.7 | 27.8 | 21.0 | 19.8 |
| Conversion of feed, vol. percent of feed | | 47.5 | 68.8 | 61.5 | 70.6 |

Constant process condition:
Press., 450 p.s.i.g.
W.H.S.V., 1.0 g./g./hr.
$H_2$:HC, molar ratio 10.
Feed: Toluene.

The following data shows the hydrodealkylation activity of copper loaded aluminosilicates of this invention.

| Catalyst: | | | |
|---|---|---|---|
| Type of zeolite | Y | | |
| Active metal | Cu | | |
| Active metal, wt. percent | 1.0 | | |
| Total percent decationization | 16 | | |
| Process conditions: | | | |
| Equilibrium temp., °C | 550 | 570 | 590 |
| Pressure, p.s.i.g | 450 | 450 | 450 |
| W.H.S.V., g./g./hr | 1.0 | 1.0 | 1.0 |
| $H_2$HC, molar | 10 | 10 | 10 |
| Hours on stream | 34 | 84 | 148 |
| Feed | Toluene | Toluene | Toluene |
| Liquid yield, wt. percent-vol. percent | 90 | 89 | 80 |
| Conversion | 41.0 | 46.4 | 61.5 |
| Molar selectivity: | | | |
| To benzene | 69.0 | 72.4 | 75.2 |
| To xylenes | 15.0 | 12.9 | 3.7 |
| To non-aromatics | 16.0 | 14.7 | 21.1 |

POLYMERIZATION

The preferred catalyst for polymerization for the present invention is the non-metal loaded catalyst. Low molecular weight gaseous and liquid olefins including $C_2$–$C_8$ olefins are polymerized to low molecular weight products boiling in the gasoline range and useful as high octane number gasoline and as petrochemical intermediates. The present polymerization process is preferably carried out at a temperature of 0–300° C., particularly 20–200° C., at a pressure of atmospheric–10,000 p.s.i.g., particularly atmospheric–1500 p.s.i.g., and at a weight-hour space velocity of 0.01–10, particularly 0.5–2.

The following example describes the polymerization of isobutylene to low molecular weight products distilling in the gasoline boiling range and also useful as valuable mono-olefinic petrochemicals, with a decationized zeolite Y catalyst in the presence of an inert solvent to dissolve the polymer product as it is formed.

Thirty grams (30) of decationized (90%) zeolite Y previously activated (dehydrated) by heating to 500° C. in an oven purged with air, was slurried in 150 ml. (98 g.) of n-hexane. Isobutylene, at atmospheric pressure, was bubbled into this slurry at a rate of approximately 1 l. per minute for 90 minutes. Conversion of the isobutylene was complete and was as rapid at the end of the run as at the start. Some cooling of the slurry was necessary to keep the temperature between 20–35° C. The gain in weight was 225 g. Distillation of the solvent-product solution yielded the following fractions after removal of the solvent:

| Fraction | B.P., °C. | $n_D^{20}$ | Wt. percent of product |
|---|---|---|---|
| Isobutylene dimer | 100–104 | [1] 1.4090 | 22.4 |
| Isobutylene trimer | 178–181 | 1.4315 | 42.0 |
| Isobutylene tetramer | 131–133 at 18–20 mm. Hg. | 1.4500 | 30.2 |
| Higher mol. wt. product. | Residue | 1.4605 | 5.4 |

[1] The dimer fraction consisted of approximately 85–90 wt. percent 2,4,4-trimethylpentene-1 (α-olefin) and 10–15 wt. percent of the less desirable 2,4,4-trimethylpentene-2 (β-olefin) by comparing the observed refractive index to the refractive index of standard mixture of α- and β-olefin. The usual ratio produced by Bronsted and Lewis acid catalysts is 75% β-olefin:25% α-olefin. Chromatographic analysis of the trimer fraction showed a single component comprised of more than 92% of the sample.

The same procedures were used to polymerize propylene. The average propylene gas addition rate was 1–2 g./g. catalyst/hour. The duration of the addition was approximately one hour and the gain in weight was approximately 20 g. The initially high conversion rate decreased progressively throughout the run. Removal of the catalyst by filtration and solvent by distillation yielded 18 g. of a clear, colorless product with an $n_D^{20}$ of 1.4420.

The following example illustrates the polymerization of liquid straight-chained olefins:

Hexene-1, 48 g. was added drop-wise to a stirred slurry of 30.0 g. of decationized zeolite Y in 155 ml. of n-hexane, at a very slow rate such that the temperature of the slurry did not rise above 36° C. The addition required 2.5 hours. Removal of the catalyst solvent and unreacted hexene-1 yielded 21 g. of liquid hydrocarbon with an $n_D^{20}$ of 1.4400. The refractive index is characteristic of a $C_{12}$-(hexene-1 dimer) olefin.

In another example, pure 2,4,4-trimethylpentene-1, 69.0 g., was added to a stirred slurry of 30.0 g. of decationized zeolite Y in 150 ml. of n-hexane solvent at a rate that the exothermic reaction did not cause the temperature of the slurry to rise above 35° C. Addition was complete in 4 hours. After removal of the catalyst (by filtration) and the solvent (by distillation), distillation of the residue, 62 g., yielded the following fractions:

| Fraction | Weight | Boiling point | $n_D^{20}$ |
|---|---|---|---|
| IB[1] trimer | 6.0 | 65–115° C. at 15 mm. Hg | 1.4355 |
| IB[1] tetramer | 47 | 119–123° C. at 15 mm. Hg | 1.4500 |
| Higher IB [1] polymer | 3.0 | Residue | 1.4600 |

[1] IB means isobutylene.

What is claimed is:

1. A process for the conversion of hydrocarbons, which comprises contacting said hydrocarbons with a decationized zeolitic molecular sieve having less than 90 percent of the aluminum atoms associated with cations, a crystalline structure capable of internally adsorbing benzene, and a silicon dioxide to aluminum trioxide molar ratio greater than 3, under hydrocarbon converting conditions.

2. A process for the conversion of hydrocarbons, which comprises contacting said hydrocarbons with a decationized zeolite molecular sieve having less than 60 percent of the aluminum atoms associated with cations, a crystalline structure capable of internally adsorbing benzene, a silicon dioxide to aluminum trioxide molar ratio greater than 3 under hydrocarbon converting conditions.

3. A process for the conversion of hydrocarbons which comprises contacting said hydrocarbons with a decationized zeolite molecular sieve having less than 60 percent of the aluminum atoms associated with cations, a crystalline structure capable of internally adsorbing benzene, a silicon dioxide to aluminum trioxide molar ratio between about 3.5–6, under hydrocarbon converting conditions.

4. A process as described in claim 1 wherein said zeolitic molecular sieve is zeolite Y.

5. A process as described in claim 2 wherein said zeolitic molecular sieve is zeolite Y.

6. A process as described in claim 3 wherein said zeolitic molecular sieve is zeolite Y.

7. A process as described in claim 1 wherein said zeolitic molecular sieve is selected from the group consisting of zeolite Y, zeolite L and faujasite.

8. A process for the cracking of hydrocarbons which comprises contacting said hydrocarbons, with decationized zeolite Y having less than 60 percent of the aluminum atoms associated with cations, a crystalline structure, a silicon dioxide to aluminum trioxide molar ratio between about 3.5–6, under cracking conditions.

9. A process for the alkylation of hydrocarbons which comprises contacting said hydrocarbons, with decationized zeolite Y having less than 60 percent of the aluminum atoms associated with cations, a crystalline structure, a silicon dioxide to aluminum trioxide molar ratio between about 3.5–6, under alkylating conditions.

10. A process for the polymerization of hydrocarbons which comprises contacting said hydrocarbons, with decationized zeolite Y having less than 60 percent of the aluminum atoms associated with cations, a crystalline structure, a silicon dioxide to aluminum trioxide molar ratio between about 3.5–6, under polymerizing conditions.

11. A process for the conversion of hydrocarbons which comprises contacting said hydrocarbons with a decationized zeolitic molecular sieve having less than 90 percent of the aluminum atoms associated with cations, a crystalline structure capable of internally adsorbing benzene, a silicon dioxide to aluminum trioxide molar ratio greater than 3, and containing a catalytically active metal in an amount of at least 0.05 weight percent; under hydrocarbon converting conditions.

12. A process for the conversion of hydrocarbons, which comprises contacting said hydrocarbons with a decationized zeolitic molecular sieve having less than 90 percent of the aluminum atoms associated with cations, a crystalline structure capable of internally adsorbing benzene, a silicon dioxide to aluminum trioxide molar ratio greater than 3, and containing a metal of Group VIII of the Periodic Table in an amount of at least 0.05 weight percent; under hydrocarbon converting conditions.

13. A process for the conversion of hydrocarbons which comprises contacting said hydrocarbons with decationized zeolite Y having less than 90 percent of the aluminum atoms associated with cations, and containing a catalytically active metal in an amount of at least about 0.05 weight percent, under hydrocarbon converting conditions.

14. A process for the conversion of hydrocarbons which comprises contacting said hydrocarbons with decationized zeolite Y having less than 90 percent of the aluminum atoms associated and containing a metal of Group VIII of the Periodic Table in an amount of at least about 0.05 weight percent, under hydrocarbon converting conditions.

15. A process for the conversion of hydrocarbons which comprises contacting said hydrocarbons in a stream of hydrogen gas with decationized zeolite Y having less than 60 percent of the aluminum atoms associated with cations, a silicon dioxide to aluminum trioxide molar ratio between about 3.5–6, and containing an elemental metal of Group VIII of the Periodic Table in an amount of from about 0.05–2.0 weight percent, under hydrocarbon converting conditions.

16. A process as described in claim 15 wherein said hydrocarbon conversion process is isomerization.

17. A process as described in claim 15 wherein said hydrocarbon conversion process is hydrocracking.

18. A process as described in claim 13 wherein said hydrocarbon conversion process is hydrodealkylation.

19. A process as described in claim 15 wherein said hydrocarbon conversion process is reforming.

20. A process as described in claim 15 wherein said hydrocarbon conversion process is alkylation.

21. A process for the hydrocracking of hydrocarbons which comprises contacting said hydrocarbons in a stream of hydrogen gas with decationized zeolite Y having less than 90 percent of the aluminum atoms associated with cations, a crystalline structure, a silicon dioxide to aluminum trioxide molar ratio between about 3.5–6, and containing an elemental metal of Group VIII of the Periodic Table in an amount of from about 0.05–2.0 weight percent and in the inner adsorption region of said zeolite Y, under hydrocracking conditions.

22. A process for the reforming of hydrocarbons which comprises contacting said hydrocarbons in a stream of hydrogen gas with decationized zeolite Y having less than 90 percent of the aluminum atoms associated with cations, a silicon dioxide to aluminum trioxide molar ratio between about 3.5–6, and containing an elemental metal Group VIII of the Periodic Table in an amount of from about 0.05–2.0 weight percent and in the inner adsorption region of said zeolite Y, said metal selected from the group consisting of palladium and platinum, under reforming conditions.

23. A process for the alkylation of hydrocarbons which comprises contacting said hydrocarbons in a stream of hydrogen gas with decationized zeolite Y having less than 90 percent of the aluminum atoms associated with cations, a silicon dioxide to aluminum trioxide molar ratio between about 3.5–6, and containing an elemental metal of Group VIII of the Periodic Table in an amount of from about 0.05–2.0 weight percent and in the inner adsorption region of said zeolite Y, said metal selected from the group consisting of palladium and platinum, under alkylating conditions.

24. A process for the isomerization of paraffinic hydrocarbons containing from four to six carbon atoms, which comprises contacting said paraffinic hydrocarbons in a stream of hydrogen gas with a decationized zeolitic molecular sieve having a crystalline structure capable of internally adsorbing benzene, a silicon dioxide to aluminum trioxide molar ratio greater than 3, having less than 60 percent of the aluminum atoms associated with cations, and containing a finely-dispersed elemental noble metal in an amount from 0.05 to 2.0 weight percent and in the inner adsorption region of said molecular sieve at a temperature of between 250° C. and 425° C.

25. A hydrocarbon conversion catalyst, which comprises a decationized zeolitic molecular sieve having a crystalline structure capable of internally adsorbing benzene, a silicon dioxide to aluminum trioxide molar ratio greater than 3, less than 60 percent of the aluminum atoms associated with cations and containing an elemental metal of Group VIII of the Periodic Table in an amount of at least about 0.05 weight percent.

26. A hydrocarbon conversion catalyst, which comprises a decationized zeolitic molecular sieve having a crystalline structure capable of internally adsorbing benzene, a silicon dioxide to aluminum trioxide molar ratio greater than about 3.5, less than 60 percent of the aluminum atoms associated with cations, and containing an elemental noble metal of Group VIII in an amount of from 0.05 to 2.0 weight percent.

27. A hydrocarbon conversion catalyst which comprises a decationized zeolitic molecular sieve having a crystalline structure capable of internally adsorbing benzene, a silicon dioxide to aluminum trioxide molar ratio greater than 3, less than 60 percent of the aluminum atoms being associated with cations, and containing an elemental noble metal of Group VIII in an amount of from 0.05 to 2.0 weight percent.

28. A hydrocarbon conversion catalyst which comprises a decationized zeolitic metal aluminosilicate molecular sieve having a crystalline structure capable of internally adsorbing benzene, a silicon dioxide to aluminum trioxide molar ratio greater than about 3.5, less than 35 percent of the aluminum atoms being associated with cations, and containing an elemental noble metal of Group VIII in an amount of from 0.2 to 0.6 weight percent.

29. A catalyst as claimed in claim 27, in which the noble metal is platinum.

30. A catalyst as claimed in claim 27, in which the noble metal is palladium.

31. A process as described in claim 12 wherein the metal is contained in the inner adsorption region of the zeolitic molecular sieve.

32. A process as described in claim 11 wherein the metal is contained in the inner adsorption region of the zeolitic molecular sieve.

33. A hydrocarbon conversion catalyst which comprises a decationized zeolite Y having a silicon dioxide to aluminum trioxide molar ration greater than about 3.5, less than 60 percent of the aluminum atoms associated with cations, and containing an elemental noble metal of Group VIII in an amount of from 0.05 to 2.0 weight percent highly dispersed within the inner adsorption region.

34. A hydrocarbon conversion catalyst which comprises a decationized zeolitic molecular sieve having a crystalline structure capable of internally adsorbing benzene, a silicon dioxide to aluminum trioxide molar ratio greater than about 3.5, less than 60 percent of the aluminum atoms associated with cations with at least part of said cations being divalent metal, and containing an elemental noble metal of Group VIII in an amount of from 0.05 to 2.0 weight percent highly dispersed within the inner adsorption region.

35. A hydrocarbon conversion catalyst which comprises a decationized zeolitic molecular sieve having a crystalline structure capable of internally adsorbing benzene, a silicon dioxide to aluminum trioxide molar ratio greater than 3, less than 60% of the aluminum atoms associated with cations, and containing in the inner adsorption region, a catalytically active elemental noble metal of Group VIII in an amount of from 0.05 to 2.0 weight percent.

References Cited by the Examiner

UNITED STATES PATENTS

| | | | |
|---|---|---|---|
| 2,971,903 | 2/1961 | Kimberlin et al. | 208—119 |
| 2,971,904 | 2/1961 | Gladrow et al. | 208—120 |
| 2,983,670 | 5/1961 | Seubold | 208—111 |
| 3,033,778 | 5/1962 | Frilette | 208—120 |
| 3,130,006 | 4/1964 | Rabo et al. | 23—110 |
| 3,130,007 | 4/1964 | Breck | 23—113 |

DELBERT E. GANTZ, *Primary Examiner.*

ALPHONSO D. SULLIVAN, *Examiner.*

A. RIMENS, *Assistant Examiner.*